United States Patent
Tseng

(10) Patent No.: US 10,489,409 B2
(45) Date of Patent: *Nov. 26, 2019

(54) PROVIDING RELEVANT NOTIFICATION BASED ON COMMON INTERESTS BETWEEN FRIENDS IN A SOCIAL NETWORKING SYSTEM

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 502 days.

This patent is subject to a terminal disclaimer.

(21) Appl. No.: 14/729,705

(22) Filed: Jun. 3, 2015

(65) Prior Publication Data

US 2015/0269167 A1 Sep. 24, 2015

Related U.S. Application Data

(63) Continuation of application No. 13/917,495, filed on Jun. 13, 2013, now Pat. No. 9,083,767, which is a
(Continued)

(51) Int. Cl.
*G06F 16/9535* (2019.01)
*G06Q 50/00* (2012.01)
(Continued)

(52) U.S. Cl.
CPC .... *G06F 16/24578* (2019.01); *G06F 16/9535* (2019.01); *H04L 65/40* (2013.01); *H04L 65/403* (2013.01); *G06Q 50/01* (2013.01)

(58) Field of Classification Search
CPC . G06F 17/3053; G06F 17/3067; G06Q 50/01; H04L 65/40; H04L 65/403
(Continued)

(56) References Cited

U.S. PATENT DOCUMENTS

| | | | |
|---|---|---|---|
| 7,716,140 B1 * | 5/2010 | Nielsen | G06F 21/6245 705/319 |
| 7,797,345 B1 * | 9/2010 | Martino | G06F 17/30867 707/792 |

(Continued)

OTHER PUBLICATIONS

United States Office Action, U.S. Appl. No. 13/917,495, dated Sep. 26, 2014, thirteen pages.
(Continued)

*Primary Examiner* — Alina A Boutah
(74) *Attorney, Agent, or Firm* — Fenwick & West LLP

(57) ABSTRACT

A social networking system provides relevant third-party content objects to users by matching user location, interests, and other social information with the content, location, and timing associated with the content objects. Content objects are provided based on relevance scores specific to a user. Relevance scores may be calculated based on the user's previous interactions with content object notifications, or based on interests that are common between the user and his or her connections in the social network. Context search is also provided for a user, wherein a list of search of results is ranked according to the relevance score of content object associated with the search results. Notifications may also be priced and distributed to users based on their relevance. In this way, the system can provide notifications that are relevant to user's interests and current circumstances, increasing the likelihood that they will find content objects of interest.

20 Claims, 10 Drawing Sheets

Related U.S. Application Data continuation of application No. 12/976,892, filed on Dec. 22, 2010, now Pat. No. 8,560,678.

(51) Int. Cl.
*G06F 16/2457* (2019.01)
*H04L 29/06* (2006.01)

(58) Field of Classification Search
USPC ........................................................ 705/319
See application file for complete search history.

(56) References Cited

U.S. PATENT DOCUMENTS

| | | | |
|---|---|---|---|
| 7,941,535 B2 | 5/2011 | Sherrets et al. | |
| 7,949,611 B1 | 5/2011 | Nielsen et al. | |
| 8,037,093 B2 | 10/2011 | Tiu et al. | |
| 8,185,558 B1 | 5/2012 | Narayanan et al. | |
| 8,250,145 B2 | 8/2012 | Zuckerberg et al. | |
| 8,271,260 B2 | 9/2012 | Wong et al. | |
| 8,271,600 B2 | 9/2012 | Herold et al. | |
| 8,306,922 B1 | 11/2012 | Kunal et al. | |
| 8,700,540 B1* | 4/2014 | Zambrano | G06Q 50/01 705/319 |
| 8,887,066 B1* | 11/2014 | Deng | G06Q 10/109 715/753 |
| 2006/0042483 A1* | 3/2006 | Work | G06Q 10/00 101/91 |
| 2006/0294085 A1* | 12/2006 | Rose | G06F 17/30616 |
| 2007/0161382 A1 | 7/2007 | Melinger et al. | |
| 2007/0281716 A1 | 12/2007 | Altman et al. | |
| 2008/0005064 A1 | 1/2008 | Sarukkai | |
| 2008/0162260 A1* | 7/2008 | Rohan | G06Q 30/02 705/14.4 |
| 2008/0201425 A1 | 8/2008 | Baker | |
| 2008/0294607 A1* | 11/2008 | Partovi | G06Q 30/00 |
| 2009/0063304 A1 | 3/2009 | Meggs | |
| 2009/0063646 A1 | 3/2009 | Mitnick | |
| 2009/0112701 A1* | 4/2009 | Turpin | G06Q 30/02 705/7.33 |
| 2009/0164929 A1* | 6/2009 | Chen | G06F 17/30867 715/769 |
| 2009/0215469 A1 | 8/2009 | Fisher et al. | |
| 2009/0221312 A1 | 9/2009 | Franklin | |
| 2009/0265326 A1* | 10/2009 | Lehrman | G06F 17/30867 |
| 2010/0069035 A1 | 3/2010 | Johnson | |
| 2010/0153215 A1* | 6/2010 | Abraham | G06F 17/30867 705/14.55 |
| 2010/0153324 A1 | 6/2010 | Downs et al. | |
| 2010/0180232 A1 | 7/2010 | Honan et al. | |
| 2010/0205242 A1 | 8/2010 | Marchioro et al. | |
| 2010/0217645 A1 | 8/2010 | Jin et al. | |
| 2010/0226284 A1 | 9/2010 | Bill | |
| 2010/0241580 A1* | 9/2010 | Schleier-Smith | G06Q 30/02 705/319 |
| 2010/0268585 A1 | 10/2010 | Padveen et al. | |
| 2010/0280902 A1 | 11/2010 | Pang | |
| 2010/0280904 A1 | 11/2010 | Ahuja | |
| 2010/0299276 A1 | 11/2010 | Shahine et al. | |
| 2011/0029388 A1 | 2/2011 | Kendall et al. | |
| 2011/0112976 A1 | 5/2011 | Ryan et al. | |
| 2011/0153423 A1* | 6/2011 | Elvekrog | G06Q 30/02 705/14.53 |
| 2011/0159856 A1 | 6/2011 | Walsh et al. | |
| 2011/0161987 A1 | 6/2011 | Huang et al. | |
| 2011/0173198 A1* | 7/2011 | Malleshaiah | G06F 17/30702 707/737 |
| 2011/0246574 A1* | 10/2011 | Lento | G06Q 10/10 709/204 |
| 2011/0252054 A1 | 10/2011 | Nielsen et al. | |
| 2011/0004831 A1 | 11/2011 | Steinberg et al. | |
| 2011/0276639 A1 | 11/2011 | Schrader | |
| 2011/0289011 A1 | 11/2011 | Hull et al. | |
| 2011/0306304 A1 | 12/2011 | Forutanpour et al. | |
| 2011/0320250 A1 | 12/2011 | Gemmell et al. | |
| 2012/0001919 A1 | 1/2012 | Lumer | |
| 2012/0066053 A1* | 3/2012 | Agarwal | G06Q 30/02 705/14.41 |
| 2012/0066067 A1 | 3/2012 | Curtis et al. | |
| 2012/0110071 A1 | 5/2012 | Zhou et al. | |
| 2012/0150966 A1 | 6/2012 | Fan et al. | |
| 2012/0150973 A1 | 6/2012 | Barak | |
| 2012/0203847 A1 | 8/2012 | Kendall et al. | |
| 2012/0204096 A1 | 8/2012 | Kendall et al. | |
| 2012/0239487 A1 | 9/2012 | Higgins et al. | |
| 2012/0265704 A1 | 10/2012 | Buyukkokten et al. | |
| 2014/0250191 A1 | 9/2014 | Altman et al. | |

OTHER PUBLICATIONS

United States Office Action, U.S. Appl. No. 12/976,892, dated Oct. 25, 2012, fifteen pages.

\* cited by examiner

PROVIDING RELEVANT NOTIFICATION BASED ON COMMON INTERESTS BETWEEN FRIENDS IN A SOCIAL NETWORKING SYSTEM

CROSS-REFERENCE TO RELATED APPLICATIONS

This application is a continuation of U.S. patent application Ser. No. 13/917,495 filed on Jun. 13, 2014 which is a continuation of U.S. patent application Ser. No. 12/976,892 filed on Dec. 22, 2010, each of which is hereby incorporated by reference in its entirety.

BACKGROUND

This invention relates generally to social networking, and in particular to providing relevant notifications for a user of a social networking system based on affinities that are common to the user and his or her friends in a social network.

Social networking systems have become prevalent in recent years because they provide a useful environment in which users can connect to and communicate with other users. A variety of different types of social networking systems exist that provide mechanisms allowing users to interact within their social networks. In this context, a user may be an individual or any other entity, such as a business or other non-person entity. Accordingly, while enabling social communications among friends, a social networking system can also be a valuable tool for businesses to engage with potential consumers.

However, businesses traditionally have had significant limits on providing advertisements and information to people that is relevant for people based on their interests, connections to others, and particular locations. At best, traditional avenues of providing information to users have consistently displayed advertisements based on basic user-provided profile information. Third party content providers have not yet been able to exploit the relationships and connections among members of a social networking website to determine preferences to impute to a user based on common preferences between the user and his or her connections in the social network.

SUMMARY

To enable a social networking system to provide relevant content objects to social networking system users, embodiments of the invention provide a mechanism for matching user location, interests, and other social information with the content, location, and timing associated with third-party content objects. In particular, embodiments of the invention enable relevance scores to be calculated for content objects with respect to relevance specific to a user of the social networking system, from which a ranked list of content objects can be used for providing notifications to the user that are relevant to them based on their interests, location, and other social information.

In one embodiment, social information is maintained by the social networking system, and a location for a device associated with the user is received. Content objects provided by third parties each are assigned a location, a category, and a delivery time range. The relevance for each content object with respect to a given user is calculated by matching up the social information and location of the user with the information assigned to the content objects. For example, a several values can be used, including a location value based on proximity between the content object and the user device location, an interest value based on whether the content of the content object matches the user's interests, a time value for based on whether the third-party content object is ready for delivery, and a connection value based on relationships that the user's connections have with the content object. The social networking system calculates a relevance score for the content objects for the user, and ranks them on this basis. In this way, the social networking system can provide content object-notifications to users that are relevant to their interests and current circumstances, greatly increasing the likelihood that the user will find the content objects of interest.

Accordingly, embodiments of the invention allow the social networking system to evaluate content objects for their relevance to a user before providing them to the user. This functionality allows for user exposure to content objects, e.g., via notifications, that are relevant to the user's interests, relying on the rich social information provided by the social networking service.

In one embodiment, the social networking system identifies content object-notifications to provide to a user based on interests or preferences common to the user and his or her connections in the social network. The social networking system determines common interests between the user and his or her friends and may determine which interests to impute to the user based on the interests of the user's friends. Thus, the social networking system may determine content object-notifications to provide to the user based upon the relevance of those notifications to the user's friends.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
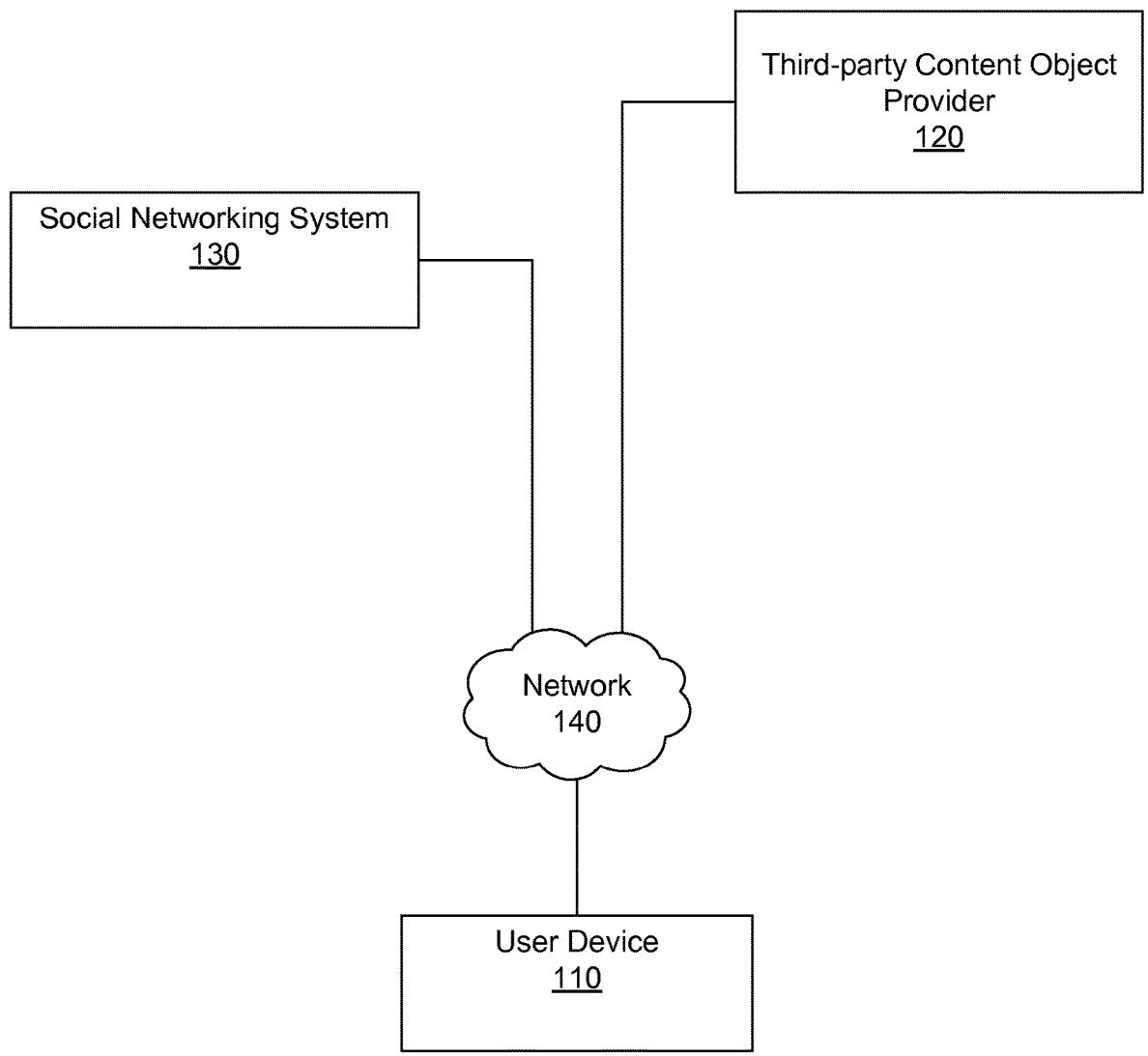
FIG. 1 is a network diagram of one embodiment of a system for providing social networking system user notifications.

FIG. 1 is a network diagram of one embodiment of a system 100 for providing notifications for a user (e.g., member) of a social networking system 130. The system 100 includes one or more user devices 110, one or more third-party content object provider 120, the social networking system 130 and a network 140. For purposes of illustration, the embodiment of the system 100 shown by FIG. 1 includes a single third-party content object provider 120 and a single user device 110. However, in other embodiments, the system 100 may include more user devices 110 and/or more third-party content object providers 120. In certain embodiments, the social networking system 130 is operated by the social network provider, whereas the third-party content object providers 120 are separate from the social networking system 130 in that they may be operated by different entities. In various embodiments, however, the social networking system 130 and the third-party content object providers 120 operate in conjunction to provide social networking services to users of the social networking system 130. In this sense, the social networking system 130 provides a platform, or backbone, which other systems, such as third-party content object providers 120, may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the third-party content object provider 120 and the social networking system 130 via the network 140, which may comprise any combination of local area and/or wide area networks, using both wired and wireless communication systems. In one embodiment, the user device 110 displays content from the third-party content object provider 120 and/or from the social networking system 130.

The third-party content object provider 120 comprises one or more sources of content objects, which are communicated to the user device 110 at appropriate times. In one embodiment, the third-party content object provider 120 is a separate entity from the social networking system 130. For example, the third-party content object provider 120 is associated with a first domain while the social networking system 130 is associated with a separate social networking domain. In various embodiments, the third-party content object provider 120 is located on a website or alternatively a server, separate or in conjunction from the website or server that hosts the social networking system 130.

The third-party content objects, as the term is used herein, include any content object generated by a third-party content object provider 120 rather than by a user of the social networking system 130. Third-party content objects include informational content objects, such as movie show times, movie reviews, restaurant reviews, restaurant menus, product information and reviews, etc., as well as incentive content objects, such as coupons, discount tickets, gift certificates, etc. according to one embodiment. In addition, some third-party content objects may include a combination of information and incentives. Other examples of content objects include event content objects associated with an event (e.g., a New Year's Eve party) or ad-hoc gathering objects (e.g., an impromptu gathering of 100 people in Union Square, San Francisco). Examples of content objects and the ways in which content objects may be presented or used are described below.

The social networking system 130 comprises one or more computing devices storing a social network, or a social graph, comprising a plurality of users and providing users of the social network with the ability to communicate and interact with other users of the social network. According to various embodiments, the social networking system 130 may comprise a website, or alternatively a server that can be accessed through a wired or wireless network 140 by user devices 110 or third-party content object providers 120. In use, users join the social networking system 130 and then add connections (i.e., relationships) to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

In addition to establishing and maintaining connections between users and allowing interactions between users, the social networking system 130 provides users with the ability to take actions on various types of items, or objects, supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 130 or by an external system of the third-party content object provider 120, which is separate from the social networking system 130 and coupled to the social networking system 130 via a network 140.

The social networking system 130 is also capable of linking a variety of entities. For example, the social networking system 130 enables users to interact with each other as well as receive content from third-party content object providers 120 or other entities, or to allow users to interact with these entities through an API or other communication channels.

The social networking system 130 also includes user-generated content objects, which enhances a user's interactions with the social networking system 130. User-generated content may include anything a user can add, upload, send, or "post," to the social networking system 130. For example, a user communicates posts to the social networking system 130 from a user device 110. Posts may include data such as status updates or other textual data, location information, photos, videos, links, music or other similar data and/or media. Content may also be added to the social networking system 130 by a third-party through a "communication channel," such as a newsfeed or stream.

Content objects, generally, represent single pieces of content that are represented as objects in the social networking system 130. In this way, users of the social networking system 130 are encouraged to communicate with each other by posting text and content objects of various types through various communication channels, increasing the interaction of users with each other and increasing the frequency with which users interact with the social networking system 130.

Figure 2:
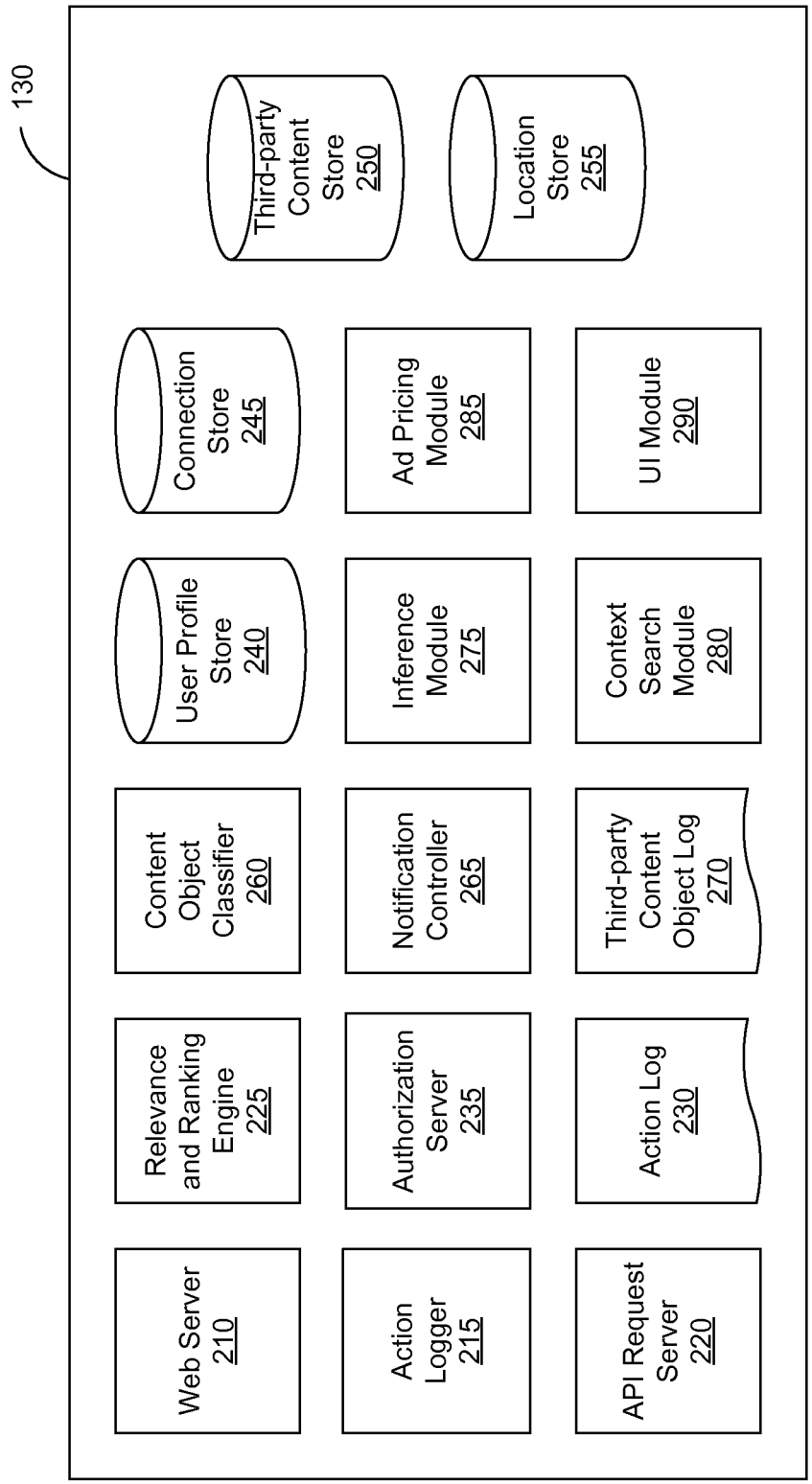
FIG. 2 is a diagram of a social networking system, in accordance with an embodiment of the invention.

FIG. 2 is a diagram of one embodiment of a social networking system 130. The embodiment of a social networking system 130 shown by FIG. 2 includes a web server 210, an action logger 215, an API request server 220, a relevance and ranking engine 225, a content object classifier 260, a notification controller 265, an action log 230, a third-party content object exposure log 232, an inference module 275, an authorization server 235, a search module 280, an ad targeting module 285, a user interface module 290, a user profile store 240, a connection store 245, a third-party content store 250, and a location store 255. In other embodiments, the social networking system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network in a user profile store 240. The user profiles include biographic, demographic, and other types of descriptive information, such as work experience, educational history, hobbies or preferences, interests, location, and the like. For example, the user profile store 240 contains data structures with fields suitable for describing a user's profile. When a new object of a particular type is created, the social networking system 130 initializes a new data structure, i.e., a "node" of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In one embodiment, user's interests may be explicitly specified in the user's profile or interests that may be inferred from the user's activities in the social networking system (e.g., uploaded content, postings, reading of messages, etc). Additionally, the user profile store 240 includes logic for maintaining user interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 130.

For example, the user profile store 240 includes logic for maintaining interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 130.

The social networking system 130 further stores data describing one or more connections between different users in a user connection store 245. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 120, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130.

The web server 210 links the social networking system to one or more user devices 110 and/or one or more third-party content object providers 120 via the network 140. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more third-party content object providers 120 to access information from the social networking system 130 by calling one or more APIs. The API request server 220 also may allow third-party content object providers 120 to send information to the social networking system by calling APIs. For example, a third-party content object provider 120 sends an API request to the social networking system 130 via the network 140 and the API request server 220 receives the API request. The API request server 220 processes the request by calling an API associated with the API request to generate an appropriate response, which the API request server 220 communicates to the third-party content object provider 120 via the network 140.

The action logger 215 is capable of receiving communications from the web server 210 about user actions on and/or off the social networking system 130. The action logger 215 populates the action log 230 with information about user actions, allowing the social networking system 130 to track or monitor various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in the action log 230. In one embodiment, the social networking system maintains the action log 230 as a database of entries. When an action is taken within the social networking system 130, an entry for the action is added to the action log 230.

The relevance and ranking engine 225 includes logic for calculating a relevance score for third-party content objects relative to a user, for ranking the third-party content objects by their relevance scores, and for selecting third-party content objects for sending to users as notifications. To calculate the relevance score, the relevance and ranking engine 225 determines a location value by comparing the content object location and a current location for the user device 210, determines an interest value based on whether the third-party content object categories are included in the user's interests, determines a time value based on whether the current time is within the delivery time range for the third-party content object, and determines a connection value based on how many of the user's connections are associated with the third-party content object. Then, the relevance and ranking engine 225 combines the location value, interest value, connection value, and time value to determine the relevance score for the third-party content object with respect to the user. In one embodiment the values are higher for a better fit (closer proximity, great similarity, etc.) and approach a value of one, and are multiplied together to yield the relevance score. From the relevance scores for each third-party content object, the relevance and ranking engine 225 ranks the content objects for a user, e.g., from highest relevance score to lowest. The relevance and ranking engine 225 then can select third-party content objects to send to a notification controller 265, or can serve the highest ranked content object directly to the user device 110 as a notification(s).

The content object classifier 260 includes logic for assigning each of the third-party content objects a location, a category, and a delivery time range. Categories may reflect various categories of user interests, and may be associated with the interests themselves, e.g., a user "likes" an article about a brand of shoes and the category is the brand, or the article about the shoe brand is assigned a general category of "shoes" or "clothing." Multiple categories may apply to a single content object. General or specific locations may be assigned to content objects as well, e.g., a city, a particular street name or intersection, or GPS coordinates. A delivery time range is assigned to each content object, e.g., using a useful range based on the hours the associated business is open.

Additionally, user actions may be associated with exposure to third-party content objects from one or more third-party content object providers 120. Thus, in conjunction with the action log 230, a third-party content exposure log 232 is maintained of user exposures to such objects and when the last exposure occurred. The action logger 215 receives data describing a user's interaction with an object and stores it to the third-party content exposure log 232. The third-party content object log 270 includes logic for storing user exposures to third-party content objects and associations between users and objects. The exposure information can be used to determine whether to expose the user to the same or similar content objects, and for adjusting the ranking and selection of content objects on the basis of whether the user previously has been exposed to the same or similar content object. In addition, if a user becomes associated with a content object via an action, e.g., uses an incentive, goes to the location, etc., that information also is stored, and can be used for re-ranking and re-selecting the content objects.

The notification controller 265 provides notifications of content objects to the user device 110. The notifications of content objects are initially pushed to the user device 110 according to a default rate. Based on user engagement with the notifications, the notification controller 265 may adjust the rate in which notifications are provided to the user device 110. By adjusting the initial settings, the notification controller 265 provides notifications of content objects to the user device 110 when the user is more likely to engage with the notifications. Additionally, the type of content that is provided to the client device 110 may be updated based on the user engagement.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites or any entity that can potentially access the information. The information that can be shared by a user comprises user profile information like profile photo, phone numbers associated with the user, user's connections, actions taken by the user such as adding a connection, changing user profile information and the like.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content objects, groups, events, messages, concepts, and any other things that can be represented by an object in a social networking system. An edge between two nodes in the social graph represents a particular kind of connection between the two nodes, which may result from an action that was performed by one of the nodes on the other node.

The social networking system 130 may receive a request to associate the web content with a node in the social networking system 130. An external website (e.g., of the third party content object provider 130) incorporates a tag into the markup language document for the web page(s) of the web content to claim ownership of the pages/domain in the context of the social networking system 130. In some cases, an entire domain or collection of web pages is associated with a unique identifier that associates the web pages with a node. Once established, the social networking system 130 tracks data associated with the node in the action log 230.

Data stored in the connection store 245, the user profile store 240 and the action log 230 allows the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

The third-party content object store 250 stores content objects received from third parties. The third-party content objects include informational content objects, such as movie show times, restaurant menus, etc., as well as incentive content objects, such as coupons, discount tickets, gift certificates, etc. In addition, some third-party content objects may include a combination of information and incentives.

The location store 255 stores location information received from user devices associated with users. The location information used by the social networking system 130 may be obtained directly from user devices 110, e.g., at the time a notification is to be sent or at various predetermined time intervals, or the location information may be a last stored location received from the user device 110. In addition, the location store 255 may receive updated location information, e.g., in response to a change in the location of a user device 110. In one embodiment, if an updated location is received, the updated location is provided to the relevance and ranking engine 225 for re-ranking and/or re-selecting the third-party content objects in view of the updated location information.

In general, the selection or ranking of third-party content objects may occur at varying intervals based on several variables, such as always at the beginning of a period during which a notification would be served, or every X minutes during a period during which notifications will be served, or every X minutes all the time (e.g., so that it's ready when a search happens), only in response to a change in location or expiration of a delivery time for a content object, etc. Alternatively, the ranking of third-party content objects may occur as a result of user demand. The user may explicitly request the ranking by submitting a request for relevant information happening within the vicinity of the user. The request may be received in response to user selection of a "refresh" element included in a user application associated with the present disclosure. The request may also be implicit. For example, upon launching of the user application, a request may be automatically received for the ranking.

The social networking system 130 implements context search using a context search module 280. Context search results are search results that are relevant to the user based on their current location as well as their social information. In this way, the context search results are tailored to the user's interests, connections, and location at the time of the search. The context search module 280 incorporates location information, search results and relevance score information obtained from the relevance and ranking engine 225 in order to provide a ranked list of search results and/or for selection of third-party content objects as the basis for serving notifications.

The ad pricing module 285 combines social information, the current time, and location information to provide relevant advertisements, in the form of notifications, to a user. Advertisements of increased relevance to a user are more likely to result in a purchase. Dividing consumers according to their interests based on social information allows merchants to calculate the value of their potential customers. Advertisements provided through the social networking system 130 may be priced according to the value of the customer to the merchant, as indicated by their social information.

The UI (or User Interface) module 290 is configured to display a ranked list of search results on a client device 110 that have been ranked by the context search module 280. The UI module 290 is additionally configured to generate an advertisement dashboard for merchants advertising through the social networking system 130. The advertisement dashboard allows merchants to control the distribution and price they pay for their advertisements. For both functions, the UI module is configured to generate a user interface that a client device 110 or a third-party content object provider (or merchant) 120 may interact with.

An inference module 275 determines overlapping interests between users in the social networking system 130. By determining the overlapping interests between a user and his or her friends, the inference module 275 may identify which interests may be imputed to the user based on the interests of the user's friends. Thus, through the user's friends, the inference module 275 allows the social networking system 130 to identify interests for the user that are not explicitly indicated by the user.

The third-party content object store 250 stores content objects received from third parties. The third-party content objects include informational content objects, such as movie show times, movie reviews, restaurant reviews, restaurant menus, product information and reviews, etc., as well as incentive content objects, such as coupons, discount tickets, gift certificates, etc. In addition, some third-party content objects may include a combination of information and incentives.

The location store 255 stores location information received from user devices associated with users. The location information used by the social networking system 130 may be obtained directly from user devices 110, e.g., at the time a notification is to be sent or at various predetermined time intervals, or the location information may be a last stored location received from the user device 110. In addition, the location store 255 may receive updated location information, e.g., in response to a change in the location of a user device 110. In one embodiment, if an updated location is received, the updated location is provided to the relevance and ranking engine 225 for re-ranking and or re-selection of the third-party content objects in view of the updated location information.

Selecting Relevant Content Objects for a Social Networking System User

Figure 3:
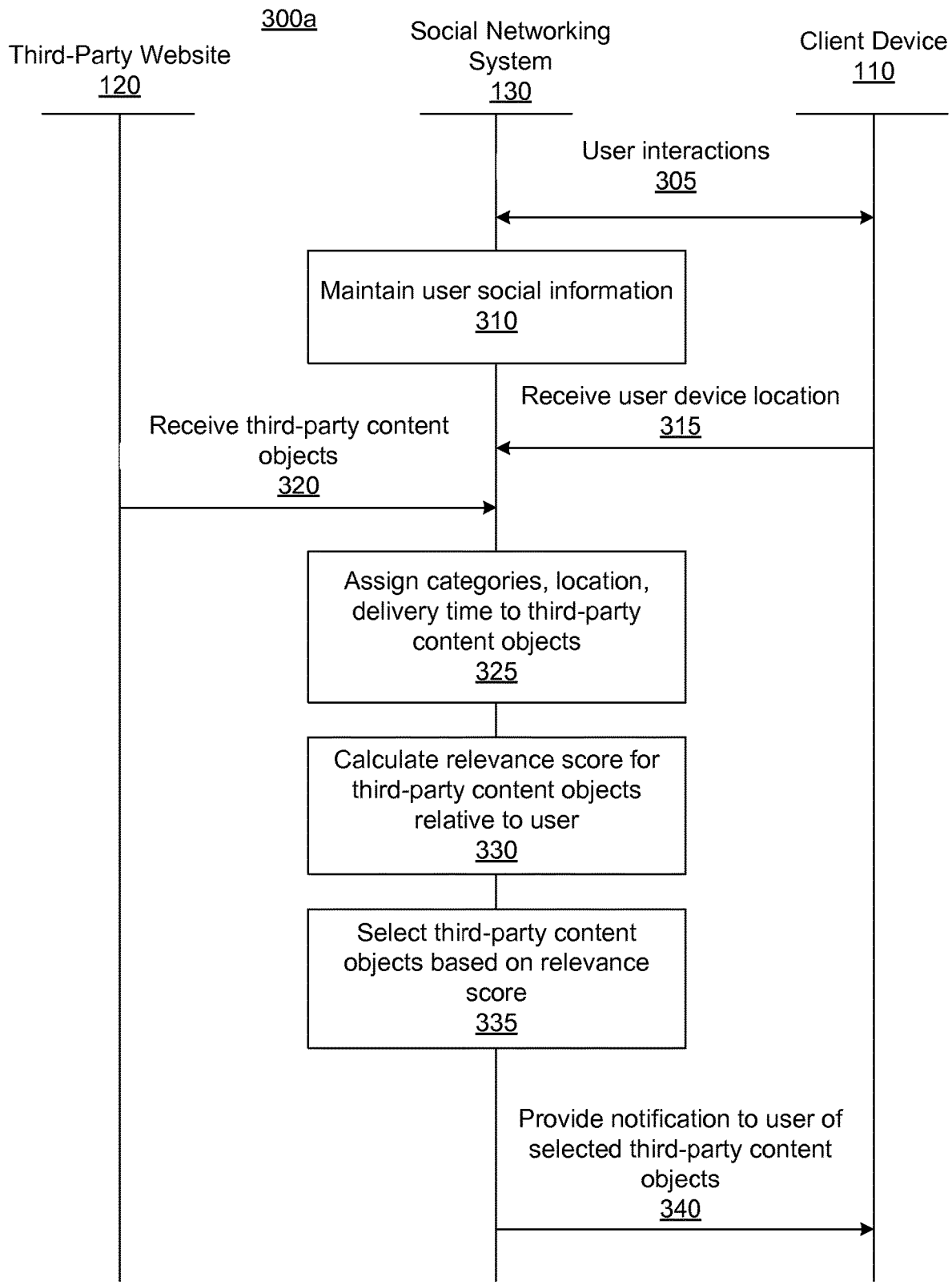
FIG. 3 is an interaction diagram of one embodiment of a process for providing relevant notifications for a user of a social networking system based on user location and social information.

FIG. 3 is an interaction diagram showing one embodiment of the process for providing a user of a social networking system with notifications relevant to the user based on their location, their interests, the time, and social information.

Initially, users, via user devices 110 interact 305 with each other via the social networking system 130 and with the social networking system 130 directly, providing it information about the user such as user interest and connection information. The social networking system 130 maintains 310 the user social information (e.g., interest and connection information for each user. For example, the social networking system 130 may categorize the interest information into categories.

The social networking system 130 receives 315 information about the location of the user device 110. This information may be obtained directly from the user device 110, e.g., at the time a notification is to be sent or at various time intervals, or the social networking system 130 may retrieve a last stored location for the user device 110. In addition, when a user device 110 changes locations, the updated location information may be provided to the social networking system 130.

The social networking system 130 also receives 320 third-party content objects from one or more third parties 120. The third-party content objects include informational content objects, such as movie show times, movie reviews, sale information, restaurant menus, etc., as well as incentive content objects, such as coupons, discount tickets, gift certificates, etc. In addition, some third-party content objects may include a combination of information and incentives.

After third-party content objects are received 320, they are assigned 325 categories, locations, and delivery time ranges. For example, categories may be established by the social networking system 130 that reflect various categories of interests of users of the social networking system 130. The categories may be associated with the interests themselves, e.g., if a user "likes" an article about a brand of shoes, the category may be the brand. Alternatively, the social networking system 130 may assign the article about the shoe brand a general category of "shoes" or "clothing." The social networking system 130 may assign both of these categories to a single content object; thus, multiple categories may apply to a single content object. For example, for an incentive offering 20% off a specialty coffee drink at a particular coffee shop, the promotion may be assigned a category "food," type "beverage," and subtype "coffee." These tags can be matched to categories associated with user interests. Locations may be assigned to content objects as well. For example, a coupon for $2.00 off of a movie ticket at a particular movie theater chain may apply to all theaters in the chain, or just one theatre. A location may be general, e.g., a city, or specific, e.g., a particular street name, or intersection, or GPS coordinate. One or more such locations are assigned to each content object. Finally, a delivery time range is assigned to a content object. The range may reflect appropriate hours for the item. For example, if the content object is a coupon for a donut store that is open only in the morning, the range for the notification likely would correspond to the hours during which the donut store is open, or some other useful range related to the open hours, e.g., fifteen minutes before opening to thirty minutes before closing.

Next, the social networking system 130 calculates 330 a relevance score for each third-party content object relative to a particular user of the social networking system 130. The social networking system 130 uses the location, interest, time, and connection information for the user and the content objects to calculate the score. For example, the social networking system 130 may first calculate scores for each of these categories that are combined to get the relevance score.

In one embodiment, for each third-party content object the social networking system 130 determines a location value based on the proximity between the content object location and a current location associated with the user device. The social networking system 130 also determines an interest value based on whether the category or categories assigned to the third-party content object are included in the category or categories associated with the user's interests. The social networking system 130 also determines a time value based on whether the current time is within the delivery time range for the third-party content object. For example, a discount coupon for lunch at a restaurant may be associated with lunch hours and is accordingly promoted more aggressively during the hours commonly associated with lunch. And the social networking system 130 determines a connection value based on how many, if any, of the user's connections are associated with the third-party content object. For example, a connection associated with the content object may include information or an incentive for a business that one of the user's connections is currently at, e.g., a connection of the user is at the frozen yogurt store that the incentive applies to. Then, the social networking system 130 combines the location value, interest value, connection value, and time value to determine the relevance score for the third-party content object with respect to the user. In one embodiment the values are higher for a better fit (closer proximity, great similarity, etc.) and approach one, and are multiplied together to yield the relevance score.

From the relevance scores of the third-party content objects, the social networking system 130 selects 335 the third-party content objects for a user, e.g., from a ranking of highest relevance score to lowest, or by selection of the highest relevance scored items. Then, the social networking system 130 can then provide 340 the selected objects to a notification controller for serving to the user, or can directly serve the selected third-party content object to the user as the next notification, when one is due. The timing of serving notification is discussed further in conjunction with FIG. 4.

Once a user is exposed to a third-party content object, the social networking system 130 stores that exposure. In addition, the social networking system 130 monitors whether the user uses the incentive, goes to the location of the information, or otherwise becomes associated with the content object, and if so, the social networking system 130 stores that information.

Timing for Providing Relevant Content Object Notifications to a User

The social networking system 130 provides notifications of content objects to user device 110. The notifications are provided to the user device 110 during time periods in a day. In one embodiment, the social networking system 130 divides a day into a series of time periods. The time periods may comprise various time ranges (e.g., hour ranges) that represent different times of the day in which to provide content object notifications. For example, the social networking system 130 may divide a day into a plurality of time periods comprising a first time period representing working hours, a second time period representing lunch hours, a third time period representing home hours, a fourth time period representing dinner hours, and a fifth time period representing resting hours. The time periods determined by the social networking system 130 are similarly applied to all the days of the week. Alternatively, different time periods are determined by the social networking system 130 for given days of the week. For example, the time periods assigned for weekdays may differ from the time periods assigned for weekends.

In one embodiment, each time period in a day is associated with a maximum number of content object notifications (maximum push rate) that the social networking system 130 provides to the user device 110 during the time period. The social networking system 130 may provide the notifications of the content objects to the user device 110 based on a default push rate of the social networking system 130. For example, the default push rate may indicate that the social networking system 130 may provide a maximum of "X" content object notifications during a first time period of the day and may provide a maximum of "Y" content object notifications during a second time period of the day and so on. Alternatively, the default push rate may indicate that the social networking system 130 may provide a maximum of "X" content object notifications per hour during the first time period of the day and a maximum of "Y" content object notifications per hour during the second time period of the day.

Once the maximum number of content object notifications is provided to the user device 110 for a given time period, the social networking system 130 determines a length of time until the next notification may be provided to the user device 110. The social networking system 130 may determine the delivery time range for the content objects for the user and the last time in which a content object notification was provided to the user. Based on the delivery time range and the last time in which the content object notification was provided, the social networking system 130 determines when the next notification is provided to the user device 110 of the user.

In one embodiment, the maximum number of content object notifications provided by the social networking system 130 during each time period may be the same across all time periods or may vary for each time period. For example, a first time period comprising the times of 9 AM to 6 PM may be associated with a lower default push rate relative to a second time period comprising the times of 6 PM to 10 PM. The first time period is associated with the lower default push rate because it corresponds to business working hours in which users typically prefer not to receive any content object notifications. In contrast, the second time period corresponds to hours in which users are at typically at home and therefore prefer to receive content object notifications during this time period.

The default push rate may also be notification type dependent. That is, the frequency in which the social networking system 130 provides content objects to the user device 110 is based on the type of notification associated with the objects. For example, incentive type content object notifications may be associated with a more frequent default push rate compared to informational type content object notifications or vice versa. Furthermore, the default push rate may also be content type dependent. In other words, the default push rate may be based on the content object included in notifications. For example, notifications about shopping may be associated with a more frequent default push rate compared to the default push rate regarding weather content.

In one embodiment, the social networking system 130 provides notifications of content objects to the user device 110 based on user preference settings specified by the user associated with device 110. The social networking system 130 provides the content object notifications based on the user preference settings rather than the default push rate. The user preference settings supersede default push rates of the social networking system 130 according to one embodiment.

The user preference settings may comprise a user specified push rate for content objects. A single user specified push rate may be applicable to all time periods within a given day. Alternatively, the user preference settings may comprises a user specified push rate for each time period in a day. The user preference settings may also comprise user specific push rates based on notification type and content type as previously described above.

The social networking system 130 updates the default push rate or user preference settings based on user interactions with notifications of content objects. The social networking system 130 identifies user interactions with notifications of content objects provided to the user device 110. As the user of device 110 interacts with the notifications, the interaction is tracked by the action loggers 215 assuming that the user is connected to the social networking system 130. If the user device 110 is not currently connected to the social networking system 130, the device 100 may provide these interactions to the social networking system 130. The social networking system 130 may receive the interactions real time or in batches at predefined times throughout the day. The interactions received at the social networking system are stored by the action logger 215 in the third-party content object log 270.

In one embodiment, the social networking system 130 analyzes the third-party content object log 270 to identify how the user engages with the notifications provided to user device 110. The social networking system 130 identifies patterns of user engagement with notifications of content objects. The patterns describe the characteristics in which the user interacted with the notifications. Based on the identified patterns, the social networking system 130 updates the rate in which content object notifications are provided to the user whether it be updating the default push rate or the user's specified preferences. Note that the following methods to identify user interaction with the notifications are only some embodiments of machine learning characteristics of the social networking system 130. Different techniques may be used in other embodiments of the social networking system 130.

The social networking system 130 may identify a time pattern characteristic from user engagement with notifications. The time pattern characteristic is indicative of time periods in which the user of device 100 interacts with notifications of content objects and time periods in which the user dismisses the notifications. For example, the social networking system 130 identifies a time pattern indicating that the user often interacts with notifications provided between the hours of 12 PM and 1 PM and from the hours of 7 PM and 10 PM. The social networking system 130 may recognize that all notifications provided outside of these time periods are dismissed by the user. Accordingly, the social networking system 130 may update or adjust the default push rate or the user preference settings to reflect the identified pattern. In other words, the social networking system 130 may increase the rate in which content object notifications are provided during the identified time period in which the user frequently interacts with notifications. The social networking system 130 may also decrease the rate in which content object notifications are provided for all other time periods of the day in which the user typically dismisses notifications.

Additionally, the social networking system 130 may identify a geographic location pattern characteristic from user engagement with notifications. The geographic location pattern characteristic indicates a geographic location(s) where the user frequently interacts with content object notifications on device 110. The social networking system 130 analyzes the third-party content object log 270 to determine the locations of the user when he or she interacted with content objects. The social networking system 130 identifies the locations where the user more frequently interacted with content object notifications. For example, the social networking system 130 may identify that the user always interacts with notifications when the user is in San Jose, Calif., but rarely interacts with the notifications when located in Palo Alto, Calif. Accordingly, the social networking system 130 adjusts the default push rate or user preference settings in order to increase the rate in which the user receives notifications while the user is at the identified location. The social networking system 130 may also decrease the rate in which the user receives notifications while the user is located at other locations.

The social networking system 130 may also identify a notification type pattern characteristic from user engagement with notifications. The notification type pattern characteristic indicates types of notifications frequently interacted with by the user of device 110. For example, the social networking system 130 may identify that the user frequently interacts with incentive content object notifications s rather that informational content object notifications. The social networking system 130 accordingly updates the default push rate or the user preferences settings so that notifications of the identified type are provided to the user device 110 at the maximum push rate or are provided more frequently than other notification types that are interacted with less frequently.

Furthermore, the social networking system 130 may identify a content type pattern characteristic from user engagement with notifications. The content type pattern characteristic indicates types of content objects (e.g., genres or categories) frequently interacted with by the user. The social networking system 130 may analyze metadata associated with content object notifications specified in the third-party content object log 270 that describe the content object notifications interacted with by the user. The social networking system 130 analyzes the metadata to determine the genres or categories of the content objects that are frequently interacted with as well as those categories of objects that are frequently dismissed by the user. For example, the social networking system 130 may identify from the metadata that notifications associated with "shoes" are interacted with more frequently by the user in comparison with notifications associated with "food." Accordingly, the social networking system 130 updates the default push rate or the user preferences settings so that notifications of the identified content type are provided to the user device 110 at the maximum push rate or are provided more frequently than other content types that are interacted with less frequently.

Note that the identified patterns described above and the adjustment of the default push rate and user preference settings are machine learning capabilities of the social networking system 130. By adjusting the initial settings, the system 130 provides more meaningful information to the user of device 110. However, the social networking system 130 may also receive updates to the user preference settings from the user of user device 110. The updated preference settings may override any adjustments to the settings made by the social networking system 130 according to one embodiment.

Once the push rates are established, whether through machine learning or through user specification, the social networking system 130 provides the notifications of content objects to the user device 110 at the maximum push rate. The social networking system 130 may provide the notifications at the maximum push rate based on the user's interests and/or current location. The third-party content objects included in the notifications are ranked and/or selected based on relevance to the user as previously described above to ensure a higher likelihood that the user will be interested in the notifications.

Figure 4:
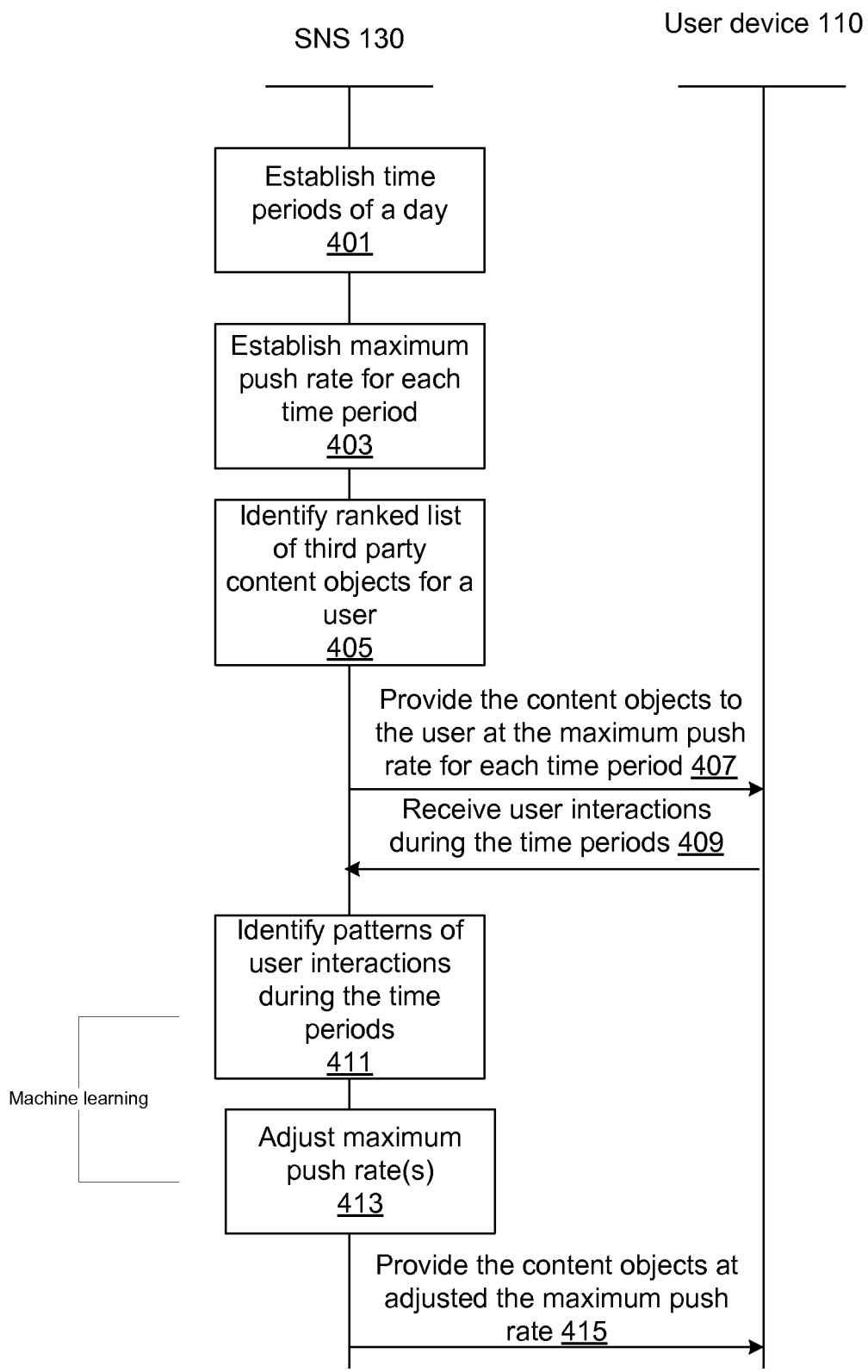
FIG. 4 is an interaction diagram for determining when to provide the relevant notifications to the user of the social networking system according to one embodiment.

FIG. 4 is an interaction diagram for determining when to provide the relevant notifications to the user of the social networking system according to one embodiment. Note that in other embodiments, different steps may be performed other than those illustrated in FIG. 4.

Initially, the social networking system 130 establishes 401 time periods for a day. That is, the social networking system 130 divides a day into one or more time periods in which a user of user device 110 will receive notifications of content objects. For example, the social networking system 130 may divide a day into a "morning" time period, an "afternoon" time period, and a "night" time period where each time period is associated with a range of hours in the day. For each period, the social networking system 130 establishes 403 a maximum push rate in which to provide the notifications of content objects to user device 110. As described previously, the maximum push rate describes the maximum number of content objects that the social networking system 130 may provide to user device 110 during a time period. The maximum push rate may be specified in the user's preference settings or be a default maximum push rate of the social networking system 130.

The social networking system 130 identifies 405 third-party content objects for the user, e.g., as described above in conjunction with FIG. 3. The identified third-party content objects can be in the form of a ranked list according to one embodiment. The social networking system 130 provides 407 content object notifications from the ranked list of third-party content objects to the user device 110 at the established maximum push rate for each time period. For example, the social networking system 130 may provide a maximum of ten notifications of content objects for each time period in the day. The social networking system 130 receives 409 from the user device 110 any user interactions with the provided notifications during the time periods. The social networking system 130 may receive the interactions real time or in batches at a specified time of the day.

The social networking system 130 identifies 411 patterns of user interactions with the notifications during the time periods. The identified patterns may be indicative of a time period(s) or geographic location(s) in which the user frequently engages with the notifications, a type of notification frequently interacted with by the user, and/or a type of content object frequently interacted with by the user. Based on the identified patterns, the social networking system 130 adjusts 413 the maximum push rates that were previously established. For example, the social networking system 130 may increase the rate in which notifications are provided to the user device 110 when the user is at a location where he or she frequently engages with notifications. The social networking system 130 then provides 414 notifications of content objects at the adjusted maximum rates at the appropriate times.

Identifying Relevant Content Objects Through Friends

The social networking system 130 determines overlapping interests between users in the social networking system 130. For a first user of the social networking system 130, the social networking system 130 identifies a second user that has a connection with the first user in the system. The social networking system 130 determines a common interest between the first user and second user. The social networking system 130 may impute interests to the first user based on the interests of other users that are connected to the first user in the social networking system 130. By inferring the first user's interests from his or her friends, the social networking system 130 may determine content object notifications of the user's friends that may also interest the first user.

In one embodiment, to determine inferred interests for a first user relative to another user, the social networking system 130 accesses the connection store 245 to identify other users of the social networking system 130 that have a connection with the first user. The social networking system 130 accesses a second user's profile from the user profile store 240 who has a connection with the first user. The social networking system 130 compares the first user's profile with the second user's profile to determine a common interest between the first user and the second user. The social networking system 130 may also review an interest hierarchy indicated in the second user's profile. The interest hierarchy indicates an ordering of interests by the user. In one embodiment, the interest hierarchy may be explicitly provided by the user. The user may provide the hierarchy when establishing or updating his or her profile.

Alternatively, the hierarchy may be determined based on the user's actions or behaviors in the social networking system 130. For example, the user may make frequent posts about "coffee" or variants thereof or upload content associated with "coffee." Accordingly, the social networking system 130 may determine the user has an interest for coffee in this example and update the user's profile with an indication of an interest in coffee.

The social networking system 130 calculates a relevance score for content object associated with the second user's interests since the first user and second user share a common interest. The common interest is an indication to the social networking system 130 that the second user's interests may also be of importance to the first user. Accordingly, the social networking system 130 determines whether to impute the second user's interests to the first user.

In one embodiment, a weighting factor is applied to the relevance score since the relevance score is calculated with respect to the second user and does not directly represent the first user's interest in content objects associated with the second user's interests. In one embodiment, as the degree of separation increases between the first user and the second in the social networking system 130 or as the interests between the users increase, the weighting factor may decrease accordingly thereby decreasing the value of the inferred relevance score. The lower weighting factor is indicative of the decreasing likelihood that the first user will share an interest in content objects of the user that is indirectly connected to the first user in the social networking system 135.

For example, for a first degree of separation indicating a direct connection between users and a common interest, a weighting factor of 90% may be applied to the relevance score. For the first indirect connection between users (e.g., second order degree of separation) the social networking system 130 may apply a predefined weighting factor such as 80%. However, as the degree of separation increases past the second order degree of separation, the weighting factor may decrease by 20%. For example, a third order degree of separation may cause the social networking system 130 to apply a weighting factor of 60% to the relevance score of content objects.

The social networking system 130 calculates the relevance score for the first user by multiplying the weighting factor to the relevance score of a content object for the second user to reduce the value of relevance score for the object. Once the relevance scores for the first user are calculated for content objects associated with the second user's interests, the social networking system 130 may traverse a path of scored content objects associated with the interests of the second user. The social networking system 130 may stop traversing the path responsive to a relevance score for a content object in the path being below a threshold. The social networking system 130 may impute the interests of the second user to the first user for those interests that have a relevance score above the threshold.

Alternatively, the social networking system 130 may only impute the interests of the second user that are related to the common interest between the first user and the second user and have an inferred relevance score above the threshold. Thus, rather than transferring any of the second user's interests to the first user that have an inferred relevance score above the threshold, the social networking system 130 transfers only the second user's interests that are related to the common interest between the first user and second user. For example, the first user and second user may have a common interest of "coffee." The second user may have an interest for specific brands of coffee such as "Starbucks" and "Peets" coffee. Responsive to the relevance score for content objects associated with the "Starbucks" and "Peets" coffee interest being above the threshold, the social networking system 130 may transfer these interests to the first user.

In another embodiment, the social networking system 130 may impute the interests of the second user that are similar to the common interest based on content. For example, the common coffee interest between the first user and second user may be categorized as a "beverage" in the social networking system 130. The social networking system 130 may determine other interests of the second user that are also categorized as a "beverage" such as an affinity for "tea" or other interests of the second user that have a categorization related to the "beverage" category such as a "food category." Responsive to the relevance score for the interest in tea being above the threshold, the social networking system 130 may transfer the interest to the first user.

In one embodiment, the social networking system 130 may also apply different weighting factors based on the type of connection between the first user and the second user other than degree of separation. For example, "friendship" type connections may be associated with a higher weighting factor than a "work colleague" type connection. The social networking system 130 may apply default weighting factors based on the type of connections between users. Alternatively, a user may specify user preference settings indicating the weight to apply to specific types of connections. For example, the user may associate a higher weighting factor with "work colleague" type connections compared to "friendship" type connections.

Once the social networking system 130 calculates the relevance scores for interests of the second user, the social networking system 130 may re-rank the list of previously established content objects, or reselect a set of the objects, related to the first user based on the inferred relevance scores. Thus, the re-ranked list includes content objects associated with the second user's interests that have been transferred to the first user. Alternatively, the social networking system 130 may include the relevance scores during the initial calculation of the relevance scores for content objects of interest to the first user. Thus, the second user's interests are considered when determining which content objects to initially provide to the first user.

Figure 5:
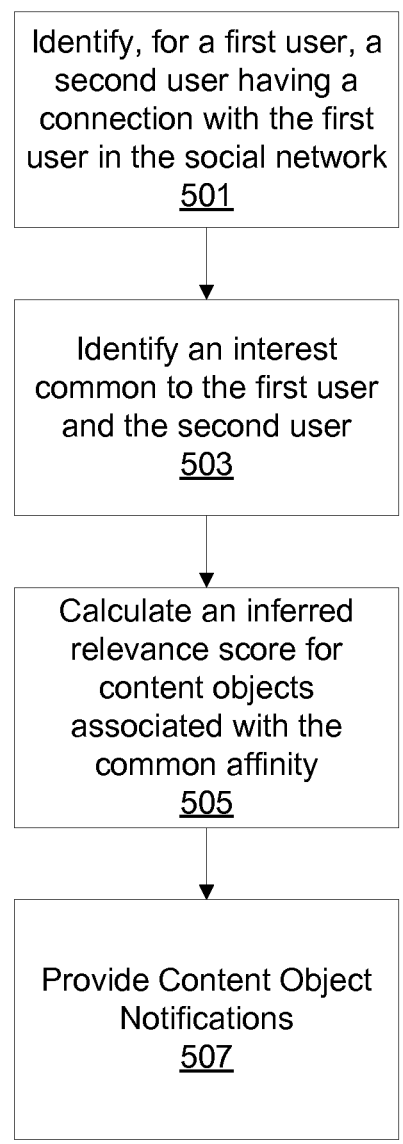
FIG. 5 is method flow diagram for determining content objects associated with a common interest between friends of the social networking system according to one embodiment.

FIG. 5 is a flow diagram determining content objects associated with a common interest between friends of the social networking system according to one embodiment. Note that in other embodiments, different steps may be performed other than those illustrated in FIG. 5.

Figure 6A:
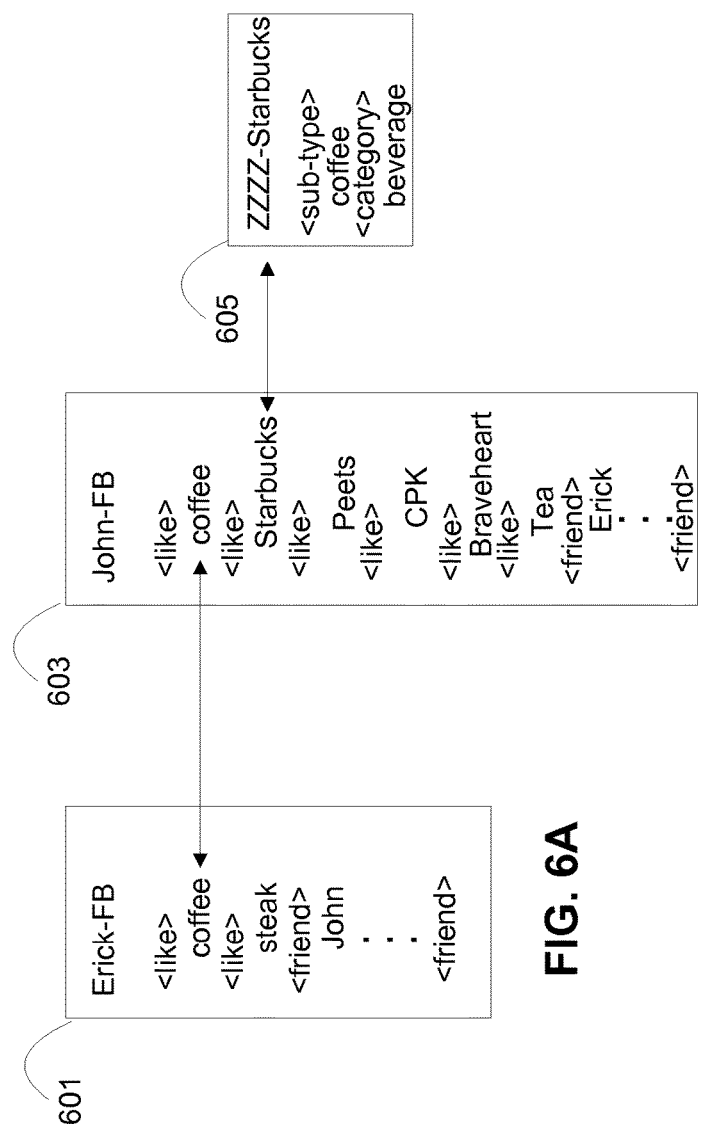
FIG. 6A illustrates a common interest indicated in user profiles of friends in the social network and FIG. 6B illustrates paths of common interests between friends in the social network according to one embodiment.

The social networking system 130 identifies, for a first user, a second user having a connection with the first user in the social network. To determine the connection, the social networking system 130 accesses the first user's profile 601 illustrated in FIG. 6A. In the example shown in FIG. 6A, the first user's profile 601 indicates that the first user "Erick" is friends with "John." Accordingly, the social networking system 130 locates John's user profile 603. Similarly, the second user's profile 603 indicates that John is also friends with Erick indicating a bidirectional relationship between the users.

The social networking system 130 then identifies 503 an interest common to the first user and the second user. In the example shown in FIG. 6A, the social networking system 130 compares profiles 601 and 603 to identify a common interest between the profiles. The comparison indicates that Erick and John both have an interest for coffee. However, John's profile 603 further indicates that John has an interest for Starbucks coffee followed by Peets coffee and CPK coffee. The social networking system 130 determines that Starbucks is associated with "coffee" due to a Starbucks object 605 indicating that Starbucks is a sub-type of "coffee" and has a categorization of "beverage." A similar determination is made for Peets coffee and CPK coffee.

The social networking system 130 then calculates 505 a relevance score for content objects associated with the common interest. The social networking system 130 first calculates the relevance score for content objects associated with the common interest for the second user based on location, time, interest, and connection information as previously described above. To determine the relevance score for the first user that indicates the measure of likelihood that the first user would also have an interest in content objects associated with the interests of the second user, the social networking system 130 applies a weighting factor to the relevance scores for the second user. As described previously, the relevance scores for the first user may be used by the social networking system 130 to re-rank or re-select the first user's ranked list of content object notifications in order to include the second user's interests. Alternatively, the social networking system 130 may be used to include content objects associated with the second user's interests in the initial determination of the first user's ranked list of content objects.

Figure 6B:
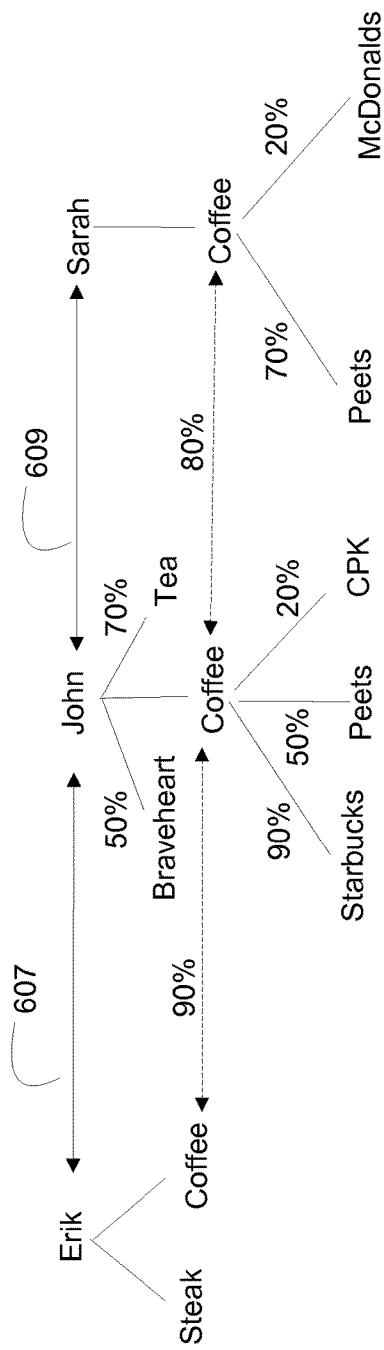

Referring now to FIG. 6B, a plurality of preference graphs (i.e., interest trees) are shown for users of the social networking system 130 in order to illustrate the calculation of the relevance scores for the first user. Each preference graph represents preferences as nodes on the graph. As shown in FIG. 6B, the preference graph for Erik includes nodes for Erik's interest for "steak" and "coffee." In contrast, John's preference graph includes nodes for John's interests in the movie "Braveheart" as well as the beverages "coffee" and "tea."

The social networking system 130 may determine John's interests that are associated with the common coffee interest between Erik and John. The coffee node has sub-nodes indicating the brands of coffee preferred by John. Each sub-node is associated with content objects corresponding to the coffee brand represented by the sub-node. The social networking system 130 calculates a relevance score for the content objects associated with each sub-node of the coffee node. Thus, the social networking system 130 calculates the relevance score for content objects associated with Starbucks, Peets, and CPK coffee. To determine an inferred relevance score for the content objects indicating a measure of likelihood that Erick would also have an interest in the content objects associated with John's interests, the social networking system 130 applies a weighting factor to the relevance scores calculated for the content objects relevant to John.

Because Erick and John are directly connected in the social networking system 130 indicated by connection 607, a higher weighting value is applied to John's interests in comparison to the weighting value used for users that are not directly connected to Erick in the social networking system 130. In the example shown in FIG. 6B, the social networking system 130's may apply a 90% weighting factor to the relevance scores for content objects associated with John's interests.

The application of the weighting factor to John's relevance scores results in a 90% likelihood (i.e., the inferred relevance score) that Erick would have interest in content object notifications associated with John's interest for Starbucks. In contrast, there is a 50% likelihood that Erick would be interested in content object notifications associated with John's interest for Peets coffee and a 20% likelihood that Erick would be interested in content object notifications associated with John's interest for CPK coffee.

In one embodiment, the social networking system 130 may traverse John's preference tree until a relevance score below a threshold value is reached in order to optimize the search for content objects associated with John's interests. The social networking system 130 may traverse the preference tree in descending order of inferred relevance scores. Once an interest with an inferred relevance score below a threshold is located, the traversal of the preference tree is stopped.

In the example in FIG. 6B, assume a threshold of 60% inferred relevance score. The social networking system 130 may first traverse the path connecting the "coffee" node to the "Starbucks" node and determine the 90% likelihood that Erick would have interest in content object notifications associated with John's interest for Starbucks. However, the traversal of the other paths connected to the "coffee" node is stopped since the path connecting the "coffee" node and "Peets" indicates a 50% likelihood that Erik would have interest in content object notifications associated with John's interest for Peets Coffee. The social networking system 130 may then traverse the next path in the preference graph indicating the John's interest for "tea." Because the path indicates a 70% likelihood that Erick would have interest in content object notifications associated with John's interest for "tea," the content objects for "tea" are provided to Erik. In contrast, the path indicating John's interest for the movie "Braveheart" indicates a 50% likelihood that Erick would have interest in content objects associated with John's interest for the movie. Thus, the social networking system would not continue to traverse any nodes connected to the "Braveheart" node. Note that FIG. 6B does not illustrate other paths from the "Braveheart" or "tea" nodes for brevity purposes.

As described previously, the social networking system 130 may also determine interests related to the common "coffee" interest based on content. In the example illustrated in FIG. 6B, the social networking system may identify that "coffee" is a type of beverage. Accordingly, the social networking system 130 identifies John's interest for other types of beverages. In the example, the social networking system 130 may determine John's interest for tea which is a type of beverage. The weighting factor is applied to John's interest for tea indicating a 70% likelihood that Erik may have an interest in John's interest for tea. Because the inferred relevance score for the "tea" interest is greater than the threshold, content objects associated with the John's interest for "tea" may be provided to Erik.

In one embodiment, the social networking system 130 may also calculate inferred relevance scores for users that are indirectly connected to the first user. In the example shown in FIG. 6B, Sarah is indirectly connected to Erick through John. Specifically, Sarah has a direct connection with John as illustrated by arrow 609. Thus, Sarah has a $2^{nd}$ order degree of separation from Erick. As previously discussed, as the degree of separation increases, the weighting factor applied to relevance scores also decreases.

In the example shown in FIG. 6B, an 80% weighting factor is applied to content objects associated with Sarah's interests rather than the 90% weighting factor used to calculate the inferred relevance scores for John's interests. The lower weighting factor is applied since Sarah is indirectly connected to Erick in the social networking system. As described previously, as the degree of separation increases between users, the applied weighting factor decreases.

The application of the weighting factor to Sarah's relevance scores in one or more of the methods described above with respect to John results in a 70% likelihood that Erick would have an interest in content object notifications associated with Sarah's interest for Seattle's Best and a 20% likelihood that Erick would have an interest in content object notifications associated with Sarah's interest for "McDonalds" coffee.

The social networking system 130 then provides 507 the content object notifications to the first user. The social networking system 130 provides content object notifications having an inferred relevance score above a threshold value. The content objects may be provided responsive to an explicit search query from the first user or may be pushed to the first user as previously described above.

Context Search Including Location and Social Relevance Information

Figure 7:
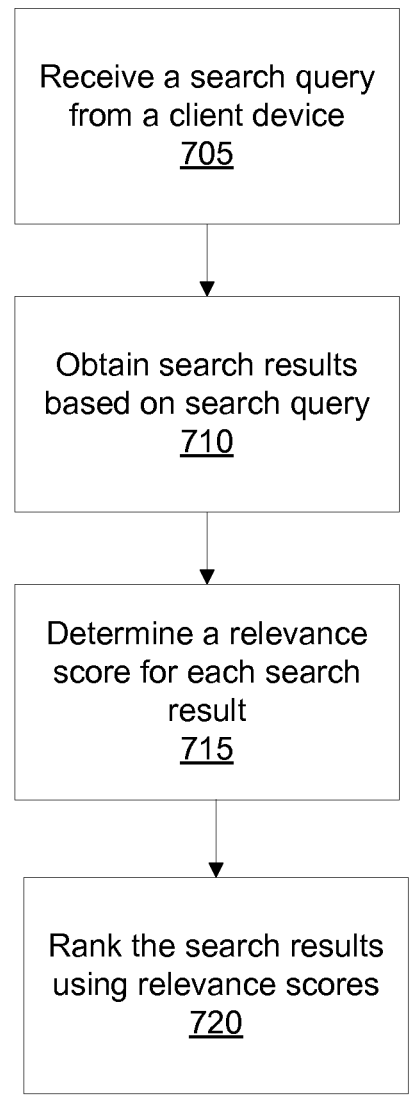
FIG. 7 is a flow chart showing one embodiment of a process for providing context search results to a user of a social networking system, where the search results are relevant to the user based on their location and social information.

FIG. 7 is a flow chart showing one embodiment of a process for providing context search results to a user of a social networking system 130. In one embodiment, context search begins by receiving 705 a search query from a client device 110 associated with a user. Often this will be a text-based query. For example, the search may be for "Italian restaurants" if the user is looking for an Italian restaurant to eat at. Near the time that the search query is entered by the user, the client device 110 or the social networking system 120 communicating with the client device determines the current location of the client device 110 associated with user. This user location and the search query 705 are communicated to the social networking system 130.

Once the context search query and user location has been received 705 from the user, the social networking system performs a search to obtain 710 search results related to the search query. In one embodiment, performing the search involves searching an external database using a search engine to obtain the search results 710. For example, the social networking system may search by using an online search engine. In another embodiment, performing the search involves searching social networking information to obtain 710 third-party content objects as search results. Each search result returned by the search may have associated with it a search value. The search value is a measure of the quality of the match between the search query and the search result. A higher search value indicates that the search engine used to perform the search believes that the search result is very close to what the user was searching for. In one embodiment, the search value varies or is normalized to vary within a range of 0 to 1, wherein a search value of 1 indicating a perfect match. In one embodiment, the received search query is modified to include the user location before the search is performed, so that the search results are more relevant to the user's current location.

A relevance score is then determined 715 for some or all of the search results. The relevance score is determined as described above, however additional factors are taken into account when determining the relevance score for search results. As described above, the relevance score may be determined for third-party content objects (e.g., based on a user interest in product created by a merchant). In embodiments where the search results are obtained from an external search engine, in order for the system 130 to assign relevance scores to the search results, the system first associates, if possible, the search results with one or more existing third-party content objects already known to the social networking system 130. In one embodiment, the search results are associated with third-party content objects by matching the search result to a category of the third-party content object.

The system 130 then determines the relevance scores for the third-party content objects and their associated search results. The relevance score calculated for a search result will be based, in part, on its associated search value, in addition to other values such as the location value, time value, connection value, interest value, for example. In some embodiments, part of the search result, e.g., the name of a restaurant, may be used as a filter for which content objects will be used as part of the relevance score.

The relevance score may be determined for all search results, or only for a subset of the search results. In one embodiment, the determination for which search results to calculate relevance scores for may be based on a cutoff threshold, for example relevance scores may only be calculated for those search results with search values greater than 0.5. In another embodiment, the relevance score is only calculated for a fixed number of search results, for example the first ten search results with the highest search values.

The social networking system 130 may also append additional social information to each search result. The appended information may include the number and/or identities of the user's friends who have indicated an interest in the search result, the number and/or identities of friends who have entered comments regarding the search result, or the identities of friends who are currently checked into the location of the search result, or who have checked into the location of the search result in the past.

The search results with associated relevance scores are ranked 720 based on the relevance scores such that search results with higher relevance scores appear higher in a ranked list of search results. The ranked list of search results may then be provided to the user through the client device 110.

In some embodiments, the relevance scores are calculated prior to performing the search or obtaining the search results. Then, once the search results are obtained, the relevance scores may be adjusted separately by the search value of the search results. In one embodiment, the adjustment comprises multiplying the search value into the relevance score to obtain an updated relevance score. In embodiments where the relevance score is calculated prior to obtaining the search results, the relevance scores may be used to improve the search query and therefore improve the relevance of the search results to the user. For example, if the user's searches for "21$^{st}$ Amendment," intending to refer to a bar or restaurant with that name, many of the search results would otherwise appear to be unrelated to bars or restaurants. However, in this example embodiment, the third-party content store 250 may include a third-party content object associated with a restaurant called "21$^{st}$ Amendment" with a high relevance score for a user interest in "restaurants." As a result of the high relevance score for restaurants with this search term, the search query may be modified to include the term "restaurants" along with "21$^{st}$ Amendment."

In some embodiments, a search query is not a necessary precondition to perform a context search. A search may be performed by the social networking system 130 by receiving input from a user requesting that all relevant third-party content objects be ranked or selected for inclusion according to their relevance score and immediately forwarded to the user. This allows a user to effectively "pull" notifications from the social networking system without having to wait to be forwarded them. Notifications forwarded to the client device 110 in this manner may be exempted from being counted towards the maximum push rate for the time period in which the user performs the search. Thus, context search temporarily overrides the social networking system's 130 control over the pushing of notifications to the client device 110. In one embodiment, the search replaces the next notification that would have been pushed to the client device 110. In another embodiment, the search does not affect the next notification, and the next notification is pushed to the client device 110 independent of the search. In yet another embodiment, the search causes the delay of the push of the next notification to the client device 110. Context search may also be used by the social networking system to identify patterns of user interactions during the time period in which the search occurred. Thus, context search may affect the maximum push rate of notifications during one or more time periods.

This is useful, for example, if the user is generally interested in socially relevant events going on around them, without having a particular idea in mind as to what to search for. In an embodiment where the user is interested in events in close proximity to their current location, the search will weigh heavily in favor third-party content objects with location data that is in close to the user's current location at the time of the search. A list of ranked results or selected items is created, where the results are ranked/selected according to their respective relevance scores as described above. In one example, a user performing a blank context search in accordance with the above may be provided with context search results indicating that three of their friends are at a nearby coffee shop. In this example, the user may not be particularly interested in coffee, but their proximity to both their friends and the coffee shop may affect their decision about what to do next.

FIG. 8 is a series of sample screenshots illustrating how a client device 110 may display a ranked list of search results to a user of a social networking system 130, where the search results are presented based on the user's location and social information. As shown at the top of FIG. 8, a text field 805 is configured to receive a search query input. The query button 810 executes a search on the entered search query. A ranked list of search results may be displayed in one or more formats.

In one embodiment, the ranked list of search results is displayed in a graphical format. In the graphical format, the search results are displayed as pins 820 (or markers), with the center of each pin 820 providing a letter or numerical indication of the relative rank of the search result (e.g., "A", "B", "C", or "1", "2", "3"). The pins are overlaid on a graphical map 815 that is associated with at least one value used to make up the relevance score. In one embodiment, the graphical map 815 may be a map of a place, for example a portion of a city. In this embodiment, the relevant value for the map is the location value, as the map is based on physical location. Each search result pin is then placed on the map according to the location information available in the third-party content object associated with the search result to which pin refers. Inside each pin 815 is an indication of the order of the search result in the ranked list of search results. For example, the search result with the second highest relevance score may be indicated with a "B" or a "2" depending upon the embodiment. In one embodiment, the graphical map 815 is centered on the user's location, as determined either at the time of the search or as determined later in time.

The ranked list of search results is displayed in a textual format 825 in addition to the graphical map 815, or instead of it. In the textual format, the ranked list of search results appear in text form, ranked according to their relevance scores. In one embodiment, the displayed ranked list of search results may be appended to include the user's social graph information, for example, likes 830 regarding a given search result, or comments 835 from friends regarding that search result. Additionally, in the case where the search results are related to locations of places or things to do, the displayed ranked list of search results may be appended to include friends or other social network connections 840 that are currently checked in at the location of that search result. For example, a search query for "restaurant" may indicate that a user has two friends who are currently eating at a nearby In-N-Out Burger.

In some embodiments, the displayed textual list of ranked search results provides the user the option of filtering the list of displayed ranked search results (not shown). Depending upon the embodiment, the search results may be filtered based on location value, time value, connection value, interest value, number of likes, number of comments, or number of friends present or near the location associated with the search result.

Figure 8A:
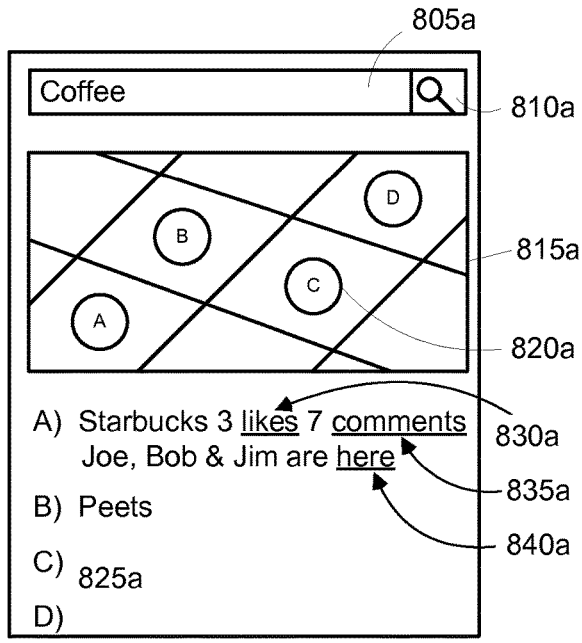
FIGS. 8A through 8D are a series of sample screenshots illustrating how a client device may display a ranked list of search results to a user of a social networking system, where the search results are presented based on the user's location and social information.

FIG. 8a is a sample screenshot of how a context search query 805a for coffee may be displayed according to one embodiment of the present invention. Coffee locations may be displayed as pins 820a, and listed 825a in order according to their relevance scores.

Figure 8B:
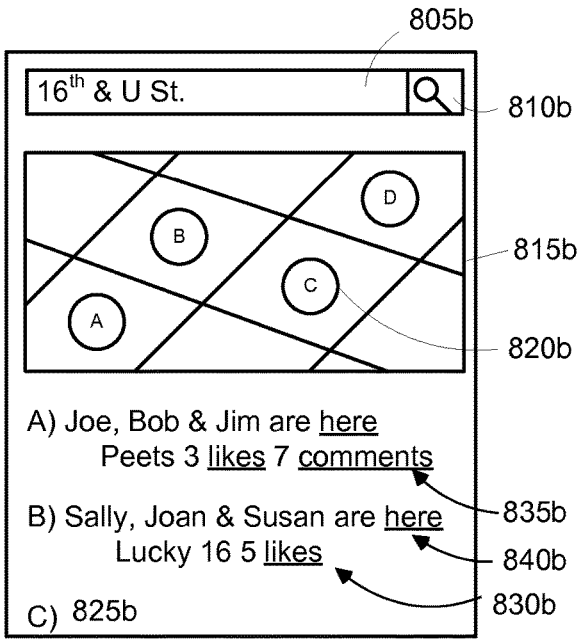

FIG. 8b is a sample screenshot of how a context search query 805b for the locations of friends nearby to a particular location may be displayed according to one embodiment of the present invention. In this example embodiment, the pins 820b and text 825b are displayed and ordered according to the relevance scores associated with the locations at which their friends are present.

Figure 8C:
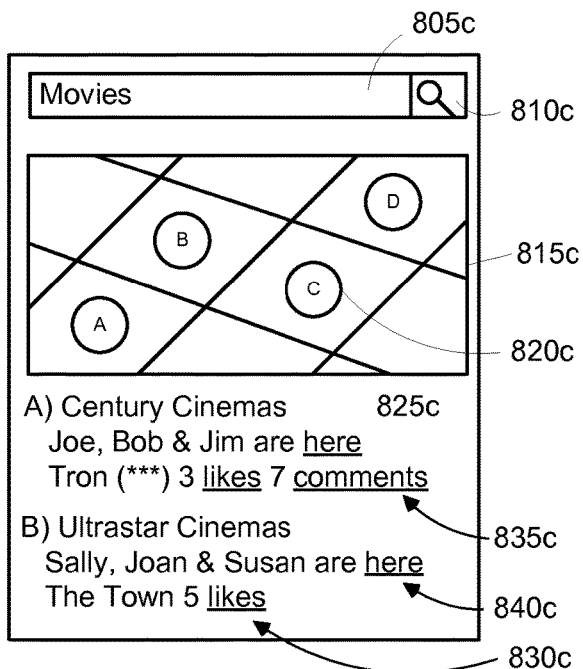

FIG. 8c is a sample screenshot of how a context search query 805c for the locations of nearby movies and movie theaters may be displayed according to one embodiment of the present invention. In this example embodiment, the pins 820c and text 825c are displayed and ordered according to the relevance scores associated with movie theaters nearby to the user's location, and the movies those movie theaters are currently showing. Critical reviews or star ratings of movies may also be displayed.

Figure 8D:
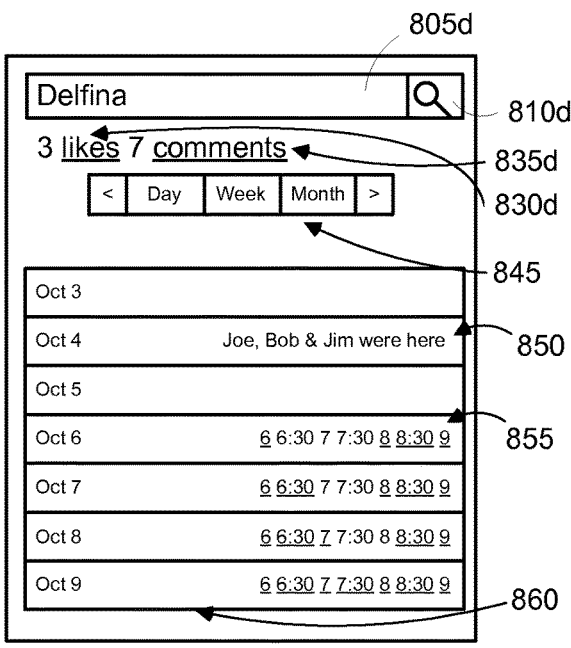

FIG. 8d is a sample screenshot of how a context search query 805d for a restaurant may be displayed according to one embodiment of the present invention. For example, if a user is interested in the availability of reservations for a particular restaurant, this screenshot illustrates how the social networking system 130 may provide a mechanism for the user to obtain reservations for a restaurant. The calendar of FIG. 8d comprises a number of entries 860, which contain times or slots which may be reserved. In one embodiment, the third-party content object for the relevant restaurant comprises available reservation slots on per day basis. A user may select a particular reservation time 855 to reserve a table on a future date at a particular time. The screenshot also illustrates, for days that have already passed, historical information regarding which of the user's friends visited 850 that restaurant and when. The user may switch between several different timelines selections 845, including day, week, and month views of the availability and historical information of the restaurant.

The embodiments illustrated in FIGS. 8c and 8d are not exclusive to movie theaters and restaurants specifically. The layout, reservation system, and historical information displayed in FIG. 8d may also be implemented to assist a user in purchasing movie tickets in advance. Vice versa, the layout of FIG. 8c (and similarly 8b and 8a) may be used to display the location and table availability of a restaurant indicated by a user in the search query field 805.

Pricing Advertisements Based on Location and Social Relevance Information

Any notification provided by social networking system 130 may be considered an advertisement. This includes traditional advertisements specifically created by merchants to be distributed as notifications to users through the social networking system, as well as notifications dynamically generated based on the user's social information and search queries. For example, a notification indicating that two of a user's friends are at a nearby coffee shop is inherently an advertisement for that coffee shop, even if the purpose of the notification was primarily to inform the user of the location of their friends. Thus, for purposes of discussion in this section, the terms "advertisement" and "notification" are interchangeable. Advertisements comprise third-party content objects including categories, locations, and delivery timing information for determining when the advertisements will be provided to the user. The social networking system 130 may also receive pre-written advertisements from third-party websites. In some cases, the advertisement may additionally comprise deals or coupons for the affiliated merchant's goods or services.

The price of advertisements is determined based on the relevance of the advertisement to the user. In one embodiment, the higher the relevance score of the advertisement for the user, the more the advertiser pays to the social networking system 130 to display the advertisement to the user. In this case, the cost of the advertisement rises in rough approximation of the expected value of the user to the advertiser. As above, the relevance score may be determined based on a location value, an interest value, a connection value, and a time value. For example, if the location associated with the advertisement is very close to the user's location at the time the advertisement is to be sent, this will cause the advertisement to be relatively more expensive than if the location is further away from the user's current location. In one embodiment, as a result of the social networking system having a maximum push rate for advertisements, advertisements of low relevance and cost will generally be provided less frequently than advertisements of higher relevance and cost.

Figure 9:
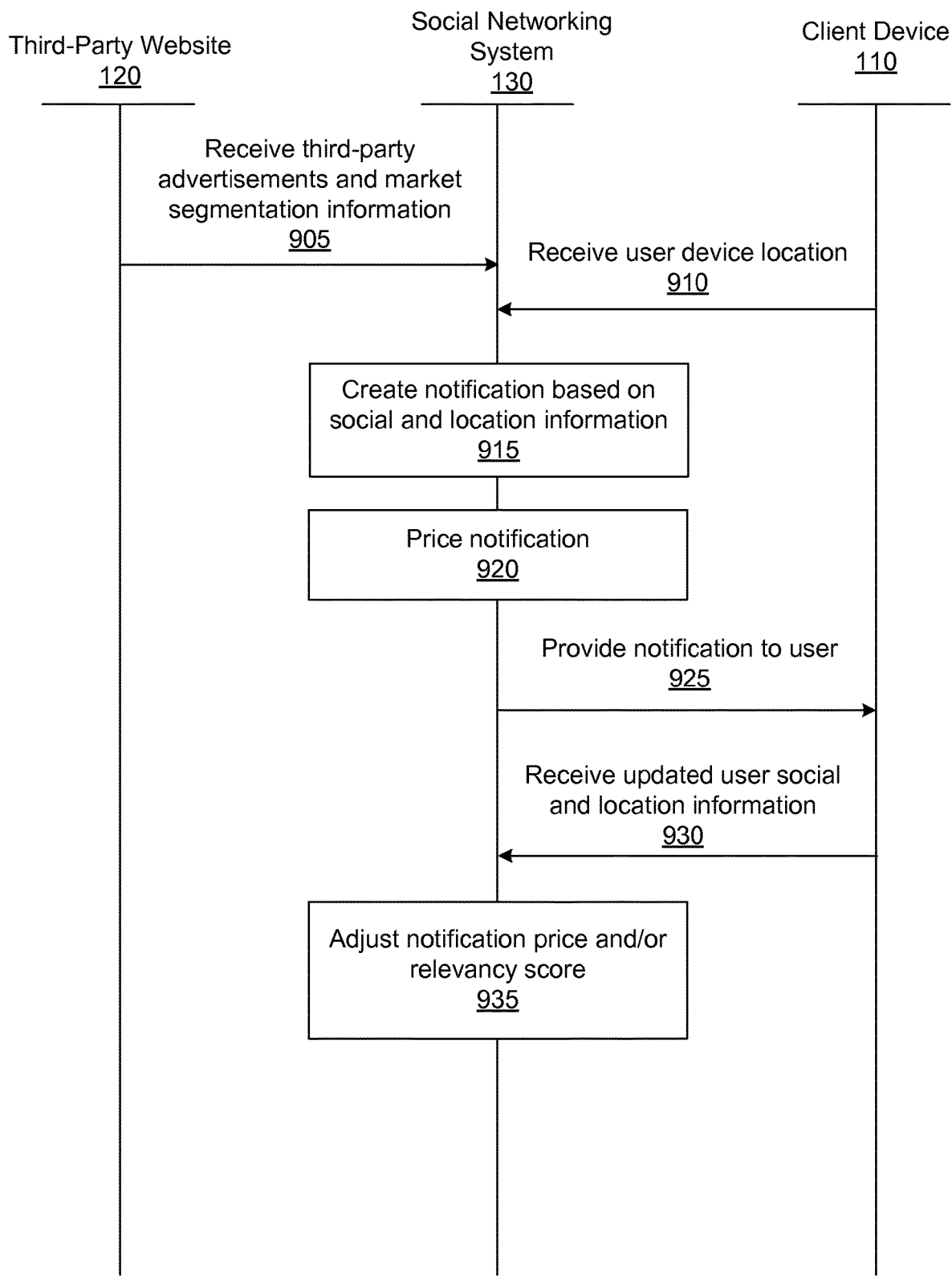
FIG. 9 is an interaction diagram showing one embodiment of the process for pricing an advertisement provided to a user of a social networking system, where the advertisement is relevant to the user based on their location and social information.

FIG. 9 is an interaction diagram showing one embodiment of the process for pricing an advertisement provided to a user of a social networking system 130, where the advertisement is relevant to the user based on the user's location and social information. In some cases, the social networking system 130 first receives 905 pre-written advertisements from third-party websites. The advertisements comprise third-party content objects including categories, locations, and delivery timing information for determining when the advertisements will be provided to the user.

At any point in time the social networking system 130 may receive 910 a user location from a client device 110. Based on the current time, the user's social information, and the received user location, the social networking system 130 determines 915 a notification (or advertisement) to provide to the user. In order to determine which notification to provide, the system 130 uses the current time, the user's location, and the user's social information to calculate the relevance of the third-party content objects stored in the system 130.

The social networking system 130 is notified of which notification is to be provided to the user. In one embodiment, the system 130 then determines 920 the price to be charged to the merchant affiliated with the notification for providing the notification to the user. In contrast, in other embodiments, the system 130 may wait until after an indication has been received informing the social networking system 130 that the notification has been received, interacted with, or has altered the user's behavior to determine a price to be charged to the merchant affiliated with the notification. In these embodiments, the price may also be based on the user's behavior, for example receiving an indication that caused a user merely to enter a store after receiving a notification may result in a notification costing a first price, whereas receiving an indication that a user made a purchase after receiving a notification may result in a notification costing a second, higher price.

The social networking system 130 provides 925 the notification to the user according to the mechanisms provided above. In some cases, the notification may additionally comprise deals or coupons for the affiliated merchant's goods or services. The social networking system 130 then receives 930 notification feedback regarding the behavior of the user in response to the notification. The notification feedback may comprise one or more of an updated user location, an indication that the user made a purchase from the affiliated merchant including whether the user made use of a provided coupon, a purchase amount, or an indication that the user paid for a purchase with a credit card or other payment system affiliated with the social networking system 130.

The notification feedback may be used for a number of different purposes depending upon the embodiment. If the merchant is paying for notifications based on the results generated by the notification, the social networking system 130 uses the notification feedback to price the notification. The notification feedback may also be used to adjust 935 the price of future notifications, for example if the ad was ineffective, the price of the ad may be reduced in the future. In one embodiment, the notification feedback may be used to adjust the relevance score, and therefore the price, for the third-party content object associated with the notification. For example, an indication that a purchase was made based on a notification may be used to increase the interest value of the third party content object associated with the notification, which may thereby increase or decrease the price for that advertisement depending upon pricing structure implemented by the social networking system 130. Similarly, if the notification was determined to be relevant based on a high connection value, the connection value may be increased as a result of the purchase.

In some embodiments, social networking system 130 also takes into account whether the advertisement is being pushed to the client device 110, or whether the user has performed a context search pulling information about nearby search results to the client device. In one embodiment, the price of an advertisement is increased if a context search results in an advertisement related to one of the search results being provided to the user. For example, the price of an advertisement for STARBUCKS may be more expensive if the user has search for coffee shops in their immediate vicinity than if the user did not perform a search and the notification controller 265 is providing the same advertisement. In another embodiment, the higher the relevance score of the advertisement for the user, the less costly the advertisement is to the user. In this case, advertisers are discouraged from sending advertisements to users who have little to no interest in the advertisement.

In one embodiment, the social networking system 130 determines the price to be charged to the merchant affiliated with the notification for providing the notification to the user. In another embodiment, the social networking system waits until after an indication has been received that the notification has been received, interacted with, or has altered the user's behavior to determine a price to be charged to the merchant affiliated with the notification. In these embodiments, the price may also be based on the user's behavior, for example receiving an indication that caused a user merely to enter a store after receiving a notification may result in a notification costing a first price, whereas receiving an indication that a user made a purchase after receiving a notification may result in a notification costing a second, higher price.

The social networking system 130 receives notification feedback regarding the behavior of the user in response to the notification. The notification feedback may comprise one or more of an updated user location, an indication that the user made a purchase from the affiliated merchant including whether the user made use of a provided coupon, a purchase amount, or an indication that the user paid for a purchase with a credit card or other payment system affiliated with the social networking system 130.

The notification feedback may be used for a number of different purposes depending upon the embodiment. If the merchant is paying for notifications based on the results generated by the notification, the social networking system uses the notification feedback to price the notification. The notification feedback may also be used to adjust the price of future notifications. For example if the ad was ineffective, the price of the ad may be reduced in the future. In one embodiment, the notification feedback may be used to adjust the relevance score, and therefore the price, for the third-party content object associated with the notification. For example, an indication that a purchase was made based on a notification may be used to increase the interest value of the third party content object associated with the notification, which may thereby increase or decrease the price for that advertisement depending upon pricing structure implemented by the social networking system 130. Similarly, if the notification was determined to be relevant based on a high connection value, the connection value may be increased as a result of the purchase.

Figure 10:
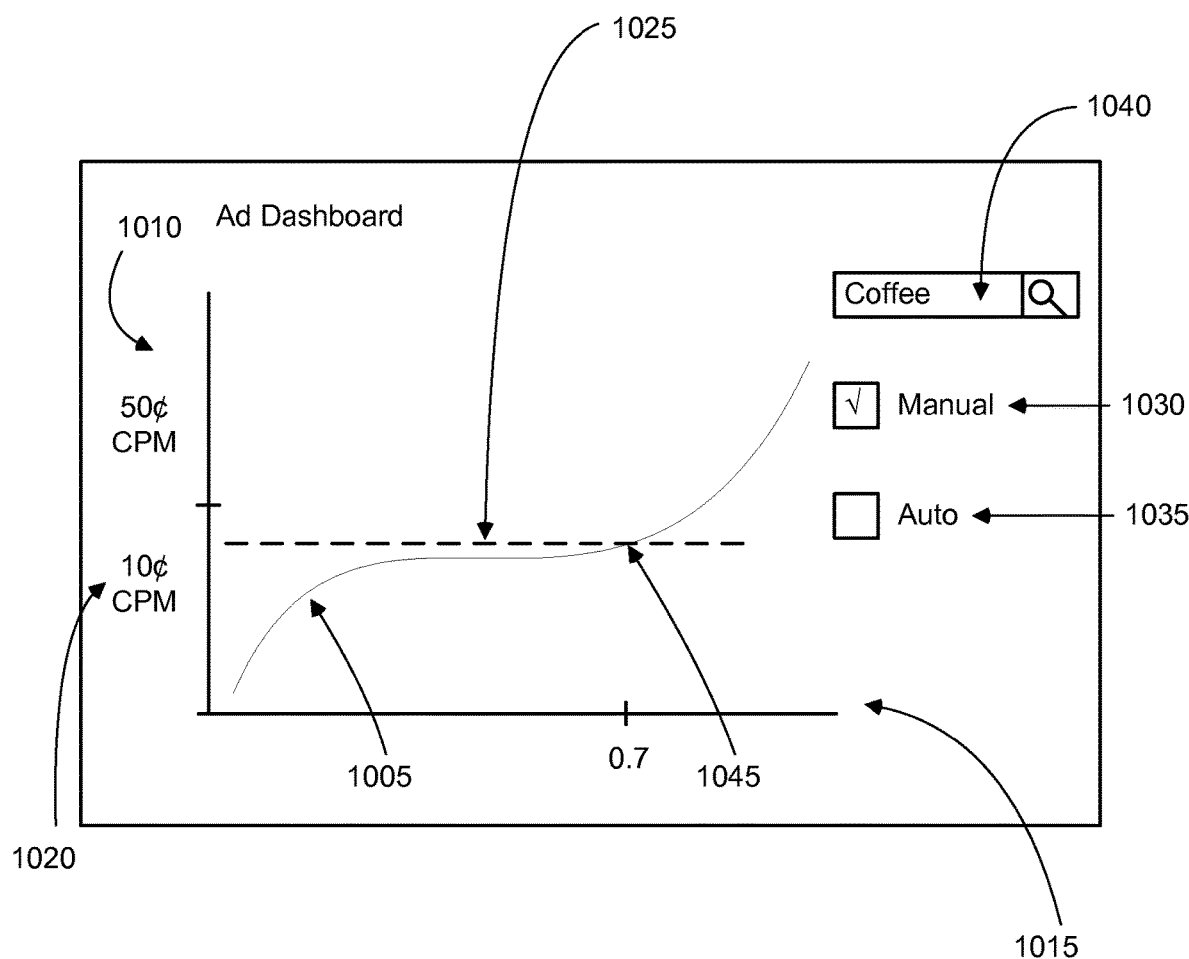
FIG. 10 is a sample screenshot illustrating an advertisement dashboard allowing a merchant to bid on advertisements provided to users of a social networking system, where the advertisements are relevant to users based on their location and social information.

Due to the dynamic nature of their generation, it is desirable to provide merchants with a method controlling the distribution and amount they pay for their notifications. FIG. 10 is a sample screenshot illustrating one embodiment of an advertisement dashboard allowing a merchant to control the distribution of advertisements provided to users of a social networking system. The advertisement dashboard allows merchants to control how their advertisements are distributed by bidding on the price they are willing to pay to have their advertisements distributed with respect to specific third-party content objects.

The advertisement dashboard comprises a search tool 1040 allowing merchants to search for individual third-party content objects, and a graph 1005 illustrating the bidding structure for individual third-party content objects. In one embodiment, each third-party content object may be associated with more than one search query keyword, so that each third-party content object may be associated with a range of related goods or services. The graph of each third-party content object illustrates the advertisement bidding price 1010 on the Y-axis, for a hypothetical relevance score 1015 on the X-axis.

Merchants may exert a differing amount over control over the pricing and distribution of their advertisements. The advertisement dashboard comprises an automatic control radio button 1035 granting the social networking system 130 permission to handle the pricing and distribution of advertisements. If this radio button is checked, the social networking system 130 uses relevance scores, or any of the constituent values that make up the relevancy score, to automatically determine the bid price for a merchant for a given third-party content object. The bid price may also vary depending upon the number of merchants seeking to advertise for each particular third-party content object, the number of notifications that are sought to be pushed to the user within a given time frame or within a given geographic area.

The advertisement dashboard also comprises a manual control radio button 1030 allowing a merchant to manually control the distribution of their advertisements. If social networking system 130 receives an indication that the merchant wishes to manually control the bid price of their advertisements, the graph 1005 is displayed such that the merchant may choose a bid price 1025 at a particular cost 1020 and maximum relevance score bid 1045.

As described above, the social networking system 130 determines the price of an advertisement provided to the user on the basis of the relevance of the advertisement to the user. By aggregating all related advertisements provided to users across a range of prices and relevance scores, the system 130 is able to plot the price of an advertisement as a function of relevance score. The price of an advertisement as a function of relevance score is plotted on the advertisement dashboard as a curve 1005. This curve represents the hypothetical relevance score and price of an advertisement for a hypothetical user. Thus, a merchant wishing to bid on advertisements may get a sense of what advertisements of varying relevance scores are going to cost.

The advertisement bid price 1025 represents the price paid by the merchant for providing an advertisement related to the searched on third-party content object up to a maximum relevance score bid 1045. The maximum relevance score bid 1045 is where the advertisement bid price crosses the curve 10005. Using the example of FIG. 10, if a notification is to be sent to the user with a relevance score of 0.7 or less, and the merchant has the highest submitted advertisement bid price 1020 relative to other merchants bidding on the same third-party content object, then the merchant's advertisement will be pushed to the user at a price based on the relevance of the advertisement. Due to the fact that the social networking system limits the maximum number notifications that may be pushed to a user, and because a notification is more likely to get pushed if it has a higher relevance score, more relevant advertisements cost more. Further, the more a merchant is willing to bid for an advertisements related to a given third-party content object, the more likely their notifications will get pushed. In other embodiments, if multiple merchants have bid on an advertisement to be pushed to a user with a given relevance score, other factors may be taken into account in order to determine which merchants advertisement to push. For example, the chosen merchant may be based on frequency past of notifications to the user, or more strongly weighting values such as the location value.

In the example of FIG. 10, the merchant has chosen a bid price that is 10 cents cost per thousand ads (CPM), which corresponds to a relevancy score of 0.7. As a result, the merchant has bid a sufficiently high price to have paid for notifications to be sent to users where the relevancy of the notifications to users will have a relevancy score of less than or equal to 0.7. In order for the merchant to have their notifications provided to users for whom the notification would be more relevant (e.g., a relevancy score of greater than 0.7), the merchant will have to bid a higher price.

In one embodiment, the advertisement dashboard can break down the relevancy category into its constituent value scores, so that merchants may bid on the price of advertisements based upon the individual values that the relevance score is based on. In order to specify bid prices based on these different values, the merchant many define one or more market segmentations. Market segmentations are divisions between groups of user of users based on one or more segmentation criteria. Segmentation criteria may include, for example, relevancy by age, gender, location, time-of-day, preferences, expected budget, loyalty, affiliations, or any combination thereof. In this embodiment, merchants may bid for advertisements according to provided market segmentation criteria. As a result, merchants may carefully define which advertisements they are bidding for.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A computer-implemented method comprising:
   maintaining, at a server, connections between users of a social networking system;
   identifying, by multiple processors of the server, a second user connected to a first user in the social networking system;

identifying, by the multiple processors of the server, an interest of the second user;

determining, by the multiple processors of the server, a relevance score for a third-party content object associated with the interest of the second user, the relevance score comprising a measure of likelihood that the second user would be interested in the third-party content object;

calculating, by the multiple processors of the server, a weighted relevance score for the third-party content object based on the determined relevance score and a type of relationship between the first user and the second user maintained by the social networking system, the weighted relevance score comprising a measure of likelihood that the first user would be interested in the third-party content object associated with the second user;

storing, by the server, the weighted relevance score for the third-party content object associated with the interest of the second user in an account associated with the first user;

selecting, by the multiple processors of the server, a plurality of third-party content objects to provide to the first user, the plurality of third-party content objects including the third-party content object associated with the interest of the second user;

determining, by the multiple processors of the server, that the second user is at a location associated with the third-party content object; and providing, by the server, the third-party content object to a user device of the first user responsive to the determination.

2. The computer-implemented method of claim 1, wherein the third-party content object is provided to the user device of the first user based at least in part on the weighted relevance score for the third-party content object.

3. The computer-implemented method of claim 1, wherein the third-party content object comprises an informational content object describing one of movie show times, movie reviews, restaurant menus, restaurant reviews, product information, or product reviews associated with the common interest.

4. The computer-implemented method of claim 1, wherein the third-party content object comprises an incentive content object describing one of coupons, discounts, promotions, or gift certificates associated with the common interest.

5. The computer-implemented method of claim 1, wherein determining the relevance score for the third-party content object comprises:

calculating a relevance score for the third-party content object relative to the second user, the relevance score based on a combination of one or more of the following:

a location value for the third-party content object, the location value based on a proximity between the location assigned to the third-party content object and a location associated with the second user;

an interest value for the third-party content object, the interest value based on whether a category assigned to the third-party content object is included in one or more categories associated with affinity information for the second user;

a time value for the third-party content object, the time value based on whether a current time is within the delivery time range assigned to the third-party content object; and a connection value for the third-party content object, the connection value based on a number of the second user's plurality of connections associated with the third-party content object.

6. The computer-implemented method of claim 1, further comprising:

varying a weight applied to the relevance score based on the type of separation between the first user and the second user.

7. The computer-implemented method of claim 6, wherein the type of separation further describes one or more degrees of separation between the first user and the second user in the social networking system.

8. The computer-implemented method of claim 3, wherein providing the third-party content object to the user device of the first user comprises:

providing the third-party content object in a search result responsive to a query from the user device of the first user or automatically providing the third-party content object to the user device of the first user.

9. The computer-implemented method of claim 1, further comprising:

determining a list of third-party content objects for the first user based on interests of the first user and based on a common interest between the first user and the second user, the list comprising the third-party content object associated with the common interest.

10. The computer-implemented method of claim 9, further comprising:

ranking a list of third-party content objects to provide to the first user to include the third-party content object associated with the common interest based at least in part on the weighted relevance score.

11. The computer-implemented method of claim 9, further comprising:

identifying an interest of the second user that is related to the common interest; and calculating a relevance score for a second third-party content object associated with the interest of the second user; and determining whether to provide the second third-party content object associated with the interest of the second user based on the relevance score.

12. A computer-program product comprising a non-transitory computer-readable storage medium including executable code, the code when executed by at least one computer processor causes the computer processor to perform steps comprising:

maintaining, at a server, connections between users of a social networking system;

identifying, by multiple processors of the server, a second user connected to a first user in the social networking system;

identifying, by the multiple processors of the server, an interest of the second user;

determining, by the multiple processors of the server, a relevance score for a third-party content object associated with the interest of the second user, the relevance score comprising a measure of likelihood that the second user would be interested in the third-party content object;

calculating, by the multiple processors of the server, a weighted relevance score for the third-party content object based on the determined relevance score and a type of relationship between the first user and the second user maintained by the social networking system, the weighted relevance score comprising a measure of likelihood that the first user would be interested in the third-party content object associated with the second user;

storing, by the server, the weighted relevance score for the third-party content object associated with the interest of the second user in an account associated with the first user;

selecting, by the multiple processors of the server, a plurality of third-party content objects to provide to the first user, the plurality of third-party content objects including the third-party content object associated with the interest of the second user;

determining, by the multiple processors of the server, that the second user is at a location associated with the third-party content object; and providing, by the server, the third-party content object to a user device of the first user responsive to the determination.

13. The computer-program product of claim 12, wherein the third-party content object is provided to the user device of the first user based at least in part on the weighted relevance score for the third-party content object.

14. The computer-program product of claim 12, wherein the third-party content object comprises an informational content object describing one of movie show times, movie reviews, restaurant menus, restaurant reviews, product information, or product reviews associated with the common interest.

15. The computer-program product of claim 12, wherein the third-party content object comprises an incentive content object describing one of coupons, discounts, promotions, or gift certificates associated with the common interest.

16. The computer-program product of claim 12, wherein calculating the relevance score for the third-party content object comprises:
   calculating a relevance score for the third-party content object relative to the second user, the relevance score based on a combination of one or more of the following:
      a location value for the third-party content object, the location value based on a proximity between the location assigned to the third-party content object and a location associated with the second user;
      an interest value for the third-party content object, the interest value based on whether a category assigned to the third-party content object is included in one or more categories associated with affinity information for the second user;
      a time value for the third-party content object, the time value based on whether a current time is within the delivery time range assigned to the third-party content object; and
      a connection value for the third-party content object, the connection value based on a number of the second user's plurality of connections associated with the third-party content object.

17. The computer-program product of claim 12, wherein the code further causes the computer processor to perform steps comprising:
   varying a weight applied to the relevance score based on the type of separation between the first user and the second user.

18. The computer-program product of claim 12, wherein the type of separation further describes one or more degrees of separation between the first user and the second user in the social networking system.

19. The computer-program product of claim 12, wherein the code further causes the computer processor to perform steps comprising:
   ranking a list of third-party content objects to provide to the first user to include the third-party content object associated with a common interest based at least in part on the weighted relevance score.

20. The computer-program product of claim 19, wherein the code further causes the computer processor to perform steps comprising:
   identifying an interest of the second user that is related to the common interest;
   calculating a relevance score for a second third-party content object associated with the interest of the second user; and
   determining whether to provide the second third-party content object associated with the interest of the second user based on the relevance score.

* * * * *